(12) United States Patent
Lipay et al.

(10) Patent No.: US 12,145,272 B2
(45) Date of Patent: Nov. 19, 2024

(54) SYSTEMS, DEVICES, ARTICLES, AND METHODS FOR PARALLELIZATION OF ROBOTS IN SYNCHRONOUS COMMUNICATION FRAMEWORK

(71) Applicant: Ocado Innovation Limited, Hatfield (GB)

(72) Inventors: Petr Lipay, San Mateo, CA (US); Jonathan Yep, Toronto (CA)

(73) Assignee: Ocado Innovation Limited, Hatfield (GB)

( * ) Notice: Subject to any disclaimer, the term of this patent is extended or adjusted under 35 U.S.C. 154(b) by 143 days.

(21) Appl. No.: 17/899,482

(22) Filed: Aug. 30, 2022

(65) Prior Publication Data

US 2022/0410383 A1   Dec. 29, 2022

Related U.S. Application Data

(63) Continuation of application No. 16/143,235, filed on Sep. 26, 2018, now Pat. No. 11,458,621.

(60) Provisional application No. 62/620,851, filed on Jan. 23, 2018, provisional application No. 62/563,786, filed on Sep. 27, 2017.

(51) Int. Cl.
*B25J 9/16* (2006.01)
*B65G 1/137* (2006.01)
*G06Q 10/0633* (2023.01)

(52) U.S. Cl.
CPC ............ *B25J 9/1628* (2013.01); *B65G 1/137* (2013.01); *G06Q 10/0633* (2013.01)

(58) Field of Classification Search
CPC ........ B25J 9/1628; B65G 1/045; B65G 1/137; G06Q 10/0633
See application file for complete search history.

(56) References Cited

U.S. PATENT DOCUMENTS

| 5,880,443 | A | * | 3/1999 | McDonald | G07F 11/64 |
| | | | | | 414/280 |
| 6,092,098 | A | * | 7/2000 | Araki | G06F 9/544 |
| | | | | | 709/201 |
| 11,458,621 | B2 | * | 10/2022 | Lipay | G06Q 10/0633 |
| 2006/0143345 | A1 | * | 6/2006 | Fredriksson | G06F 13/3625 |
| | | | | | 710/106 |
| 2013/0205295 | A1 | * | 8/2013 | Ebcioglu | G06F 15/7871 |
| | | | | | 718/1 |

(Continued)

*Primary Examiner* — Stephen Holwerda
(74) *Attorney, Agent, or Firm* — Seed Intellectual Property Law Group LLP

(57) ABSTRACT

A system including a controller, and at least two agents that communicatively access the controller. At least one of the agents is a robot. The system includes at least one processor communicatively coupled to the agents, and at least one storage device, communicatively coupled to the processor(s), that stores processor-executable instructions which, when executed, cause the processor(s) to: receive first job set of instructions provided by the controller, for a first agent included in at least two agents; and send, on behalf of the first agent, a sham status message before actual completion of the first job. The processor-executable instructions may, when executed, further cause the at least one processor to: update a data store to reflect the first job set of instructions; and receive for a second one of the at least two agents a second job set of instructions before completion of the first job.

17 Claims, 13 Drawing Sheets

(56) References Cited

U.S. PATENT DOCUMENTS

2014/0244026 A1\* 8/2014 Neiser ................. B65G 1/1378
   700/216
2016/0167228 A1\* 6/2016 Wellman ............... B25J 9/1602
   901/3

\* cited by examiner

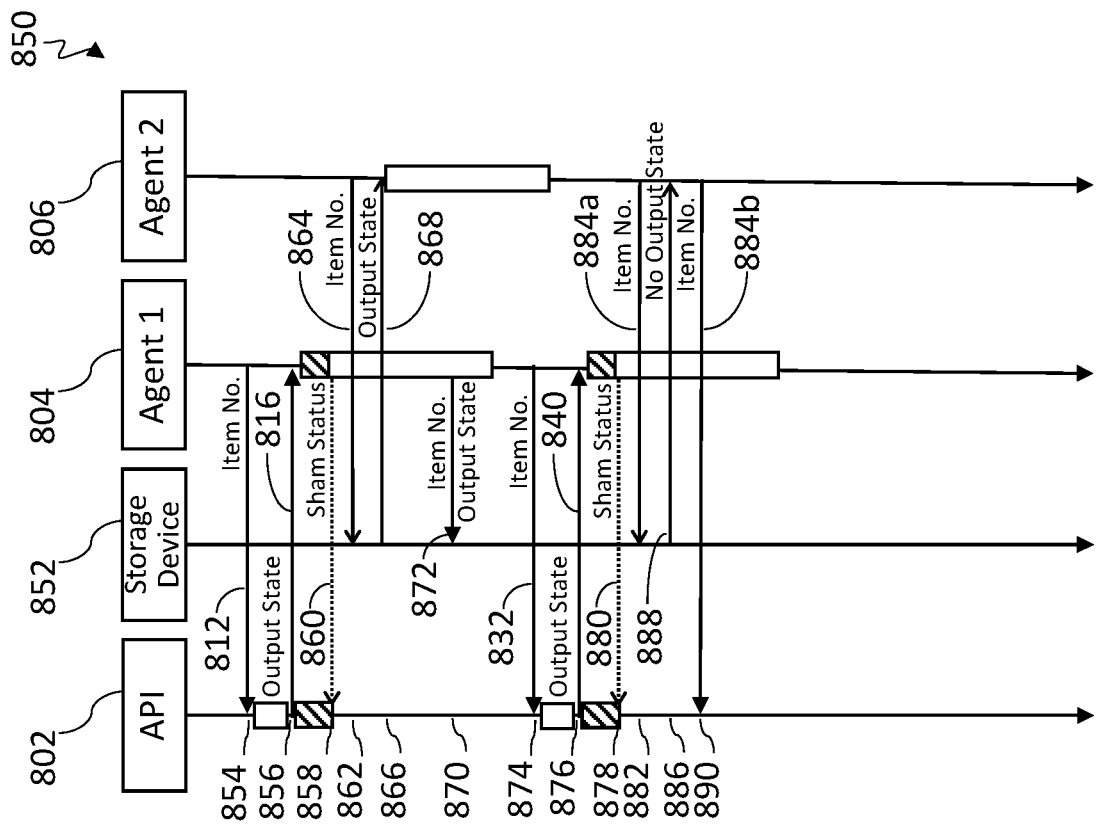
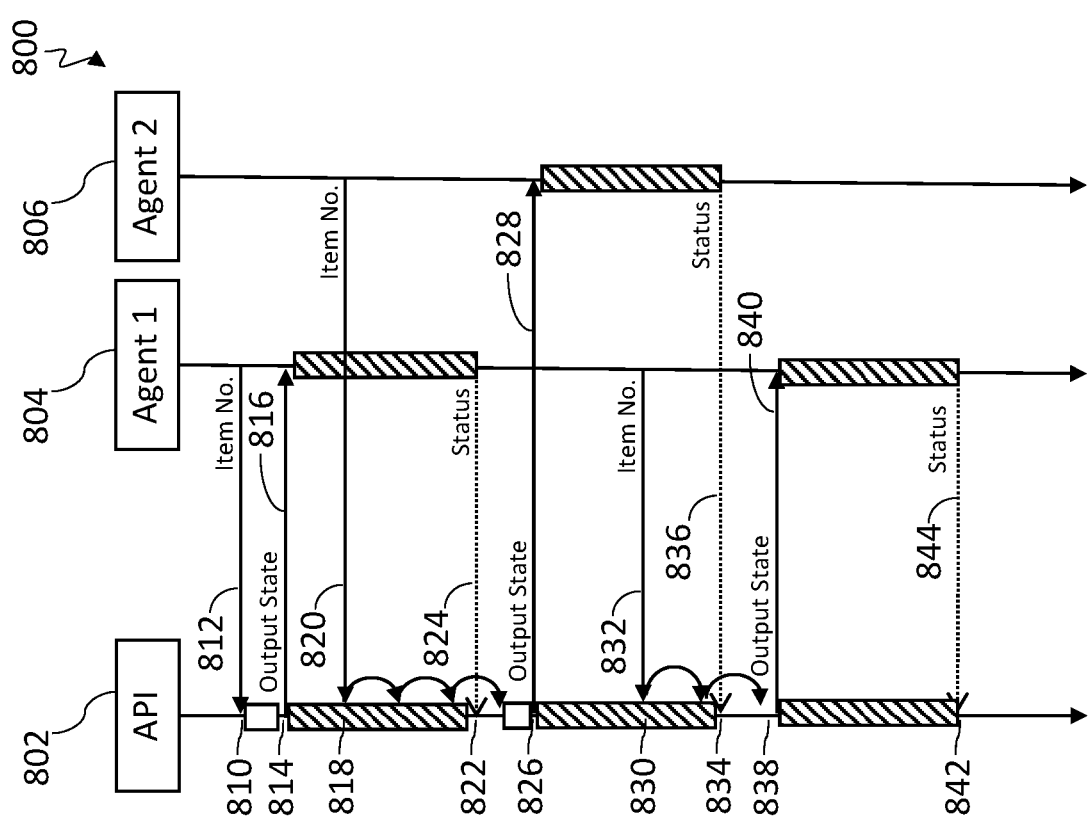
Fig. 8B
Fig. 8A

SYSTEMS, DEVICES, ARTICLES, AND METHODS FOR PARALLELIZATION OF ROBOTS IN SYNCHRONOUS COMMUNICATION FRAMEWORK

TECHNICAL FIELD

The present disclosure relates to distributed computation, and/or operation of robots and, more particularly, to robots including end-effectors that handle items and operate in a synchronous communication framework.

BACKGROUND

Description of the Related Art

Robots

Robots are systems, machines, or devices that are capable of carrying out one or more tasks. A robot is an electro-mechanical machine controlled by circuitry, for example a processor following processor-executable instructions; a human operator controllable electro-mechanical machine; a robotic subsystem of another machine including another robot; or the like. A robot has the ability to move in a physical space and to accomplish physical tasks. Robots may be operated by a human operator, such as, via remote control, or may operate autonomously without control of an operator. Hybrid robots exist in which some functions are autonomous while others are operator controlled or control switches between autonomous and operator controlled modes. As well, a robot includes computational resources to preform computational tasks. The computational tasks can be in aid of the physical tasks.

End-Effectors

An end-effector or end of arm tool is a device attached to a robotic arm, manipulator, or appendage designed or structured to interact with an environment. Examples of end-effectors include grippers or graspers. End-effectors for robot operating in unstructured environments are devices of complex design. Ideally, these can perform many tasks, including for example grasp or grip or otherwise physically releasably engage or interact with an item or object.

Communication

Processors in distributed systems use messages to exchange data and synchronize actions. Therefore, distributed system are defined, in part, by aspects of message transmission modes, syntaxes, and semantics. Communication may be categorized in many ways including: synchronous and asynchronous. In a synchronous framework, after sending a message the sender waits for a return or acknowledgement message. The sender may be in or placed in a blocked state until the return or acknowledgement message is received. Blocked includes, for example, a state where processor-executable instructions exist but may not execute because of a lack of resource(s), or suitable condition(s). For example, a first set of processor-executable instructions cannot proceed beyond a first point until a second set of processor-executable instructions reaches a second point. In an asynchronous framework the sender does not wait until a return or acknowledgement message is received. The sender thus does not enter a blocked state. Sometimes the term synchronous is applied to two more events that happen at the same time (e.g., coincident in time, belong to the same period). For example, an apparatus or methods of operation that makes use of shared, and potentially equally spaced pulses, that govern the timing of operations.

BRIEF SUMMARY

A system includes a controller, and at least two agents that communicatively access the controller. At least one of the agents being a first robot including at least one respective end-effector and at least one sensor. The system further includes at least one processor, communicatively coupled to the at least two agents, and at least one nontransitory processor-readable storage device communicatively coupled to the at least one processor. The at least one nontransitory processor-readable storage device stores processor-executable instructions which, when executed by the at least one processor, cause the at least one processor to: receive first job set of instructions provided by the controller, for a first one of the at least two agents; and send, on behalf of the first one of the at least two agents, a sham status message before actual completion, by the first one of the at least two agents, of the first job specified via the first job set of instructions. The processor-executable instructions may, when executed by the at least one processor, further cause the at least one processor to: update a data store to reflect the first job set of instructions; and receive for the second one of the at least two agents a second job set of instructions before completion of the first job specified via the first job set of instructions.

A method of operation in system including a controller, at least two agents that communicatively access the controller, at least one of the agents being a first robot including at least one respective end-effector and at least one sensor, may include receiving, a first job set of instructions provided by the controller, at a first one of the at least two agents; and sending, by the first one of the at least two agents, a sham status message before actual completion of the first job specified via the first job set of instructions. The method may further include updating a data store to reflect the first job set of instructions; and receiving, by the second one of the at least two agents, a second job set of instructions, before completion of the first job specified via the first job set of instructions.

A system includes a robot that includes at least one end-effector, at least one sensor, and at least one processor communicatively coupled to the at least one end-effector, and the at least one sensor. The system further includes at least one nontransitory processor-readable storage device communicatively coupled to the at least one processor. The at least one nontransitory processor-readable storage device stores processor-readable information including cache entries comprising one or more item numbers and one or more associated output states. The at least one nontransitory processor-readable storage device stores processor-executable instructions which, when executed by the at least one processor, cause the at least one processor to: iteratively process, by the robot, each item in the plurality of items, and process, by an agent, a second respective item in the plurality of items. To iteratively process, the processor-executable instructions may, when executed, cause the at least one processor to: receive a first respective item number for a first respective item in the plurality of items; query, based on the first respective item number, a control system via an application program interface in communicatively coupled to the at least one processor, for a first respective output state for the first respective item in the plurality of items; and receive, from the application program interface, the first respective output state for the first respective item in the plurality of items. To iteratively process, the processor-executable instructions may, when executed, cause the at least one processor to: provide a first respective sham status message to the application program interface; cause the end-effector to place the respective item in the respective stow location; and update at least one nontransitory processor-readable storage device with a respective cache entry included in the cache entries that comprises the first respective item number and the first respective output state. To process the second respective item in the plurality of items, the processor-executable instructions may, when executed, cause the at least one processor to: receive a second respective item number for the second respective item in the plurality of items; query the at least one nontransitory processor-readable storage device for a previously cached entry included in the cache entries for the second respective item in the plurality of items; receive a second respective output state for the second respective item in the plurality of items; provide a second sham status message to the application program interface; and cause the second respective item to be placed in the second respective output state.

A method of operation in a robotic system including at least one end-effector, at least one sensor, and, at least one processor in communication with the at least one end-effector and the at least one sensor, may include: receiving a plurality of items; iteratively processing each item in the plurality of items; and processing, by an agent, a second respective item in the plurality of items. The iterative processing may include: extracting, by the at least one processor and the at least one sensor, a first respective item number for a respective item in the plurality of items; querying, by the at least one processor, based on the first respective item number, a control system via an application program interface for a first respective output state for the first respective item in the plurality of items, wherein the at least one processor is in communication with the application program interface; and receiving, from the application program interface, the first respective output state for the first respective item in the plurality of items. The iterative processing further may include: providing, by the at least one processor to the control system via the application program interface, a first respective sham status message; causing, by the at least one processor, the end-effector to place the respective item in the respective output state; and updating, by the at least one processor, a storage device in communication with the at least one processor with a respective cache entry that comprises the respective item number and the respective output state. The processing by the agent may include: extracting, by the at least one processor and the at least one sensor, a second respective item number for the second respective item in the plurality of items; querying, by the at least one processor, the storage device for a previously cached entry for the second respective item in the plurality of items; receiving, by the at least one processor, a second respective output state for the second respective item in the plurality of items; and causing, by the at least one processor, the second respective item to be placed in the second respective output state.

A robot may be summarized substantially as described and illustrated herein.

A system comprising at least two agents, at least one of the at least two agents includes an end-effector and a sensor, substantially as described and illustrated herein.

A system comprising at least two agents, at least one of the at least two agents includes an end-effector and a sensor, the at least two agents are communicatively coupled to a control system, substantially as described and illustrated herein.

A method of operation of at least two agents, at least one of the at least two agents includes an end-effector and a sensor, and where the at least two agents are in communication with a control system via an application program interface, substantially as described and illustrated herein.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

Systems, devices, articles, and methods are described in greater detail herein with reference to the following figures in which:

FIG. 8A and FIG. 8B are interactions diagram schematically illustrating implementations methods of operation in a system including at least two agents and a control system;

DETAILED DESCRIPTION

Figure 1:
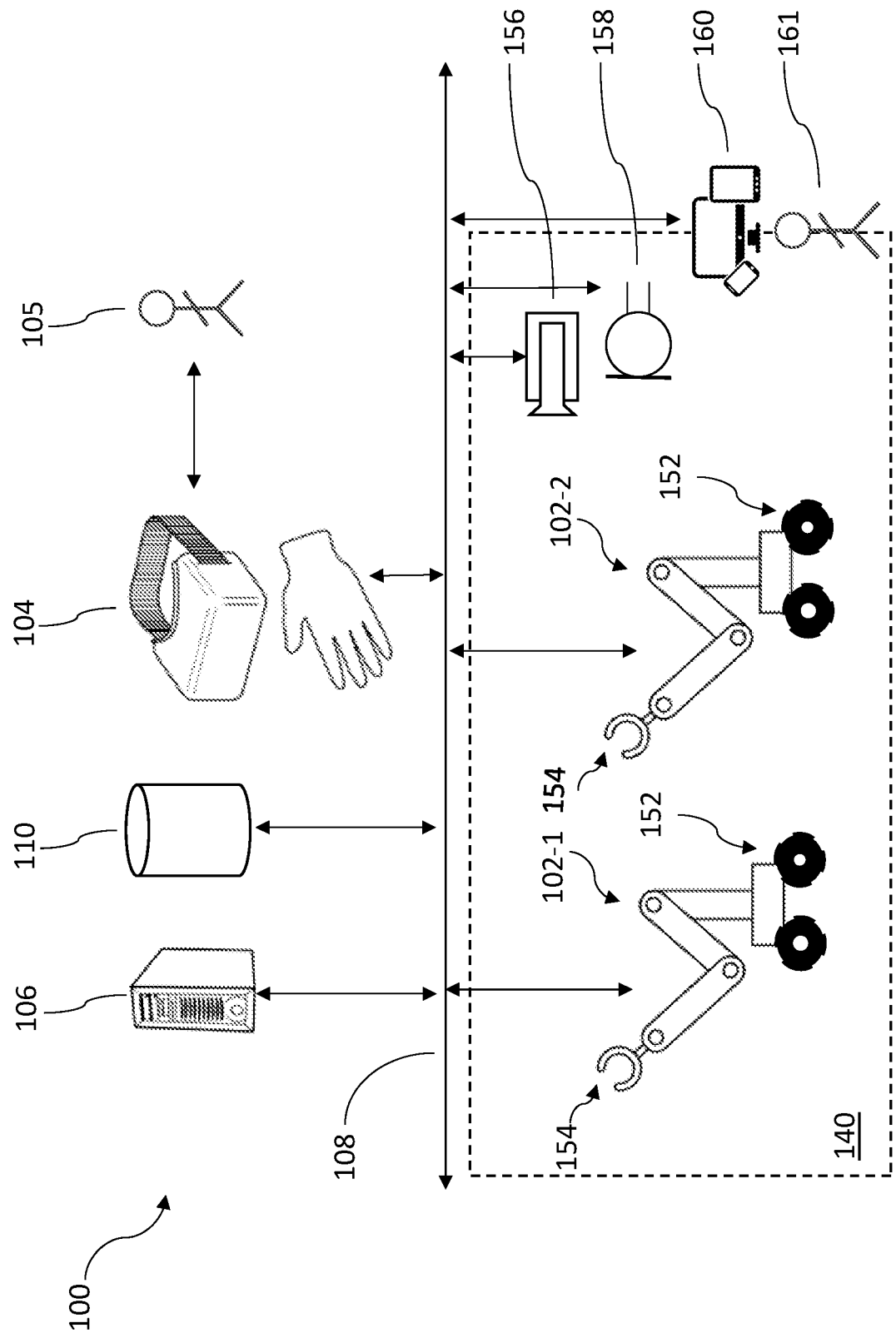
FIG. 1 is a schematic diagram illustrating a portion of a robotic system.

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with end-effectors and/or robotics, such as processors, sensors, storage devices, network interfaces, workpieces, tensile members, fasteners, electrical connectors, mixers, and the like are not shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one", "an", or "another" applied to "embodiment", "example", means that a particular referent feature, structure, or characteristic described in connection with the embodiment, example, or implementation is included in at least one embodiment, example, or implementation. Thus, the appearances of the phrases "in one embodiment", "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the user forms "a", "an", and "the" include plural referents unless the content clearly dictates otherwise. Thus, for example, reference to a robot including "an end-effector" includes an end-effector, or two or more end-effectors. It should also be noted that the term "or" is generally employed in its sense including "and/or" unless the content clearly dictates otherwise.

The headings provided herein are for convenience only and do not interpret the scope or meaning of the embodiments.

Some control systems for robots are designed or operate based on up to three (3) of the following assumptions. One, the controller has exclusive control over a respective robot. Two, the respective robot has exclusive access to a plurality of locations (e.g., reception spaces) to manipulate (e.g., work, process) a plurality of items. Three, the respective robot has exclusive access the plurality of items. In view of one more of these assumptions, control systems may operate synchronously. That is, the control system waits for a response from a first directed agent, and is unresponsive to communications with/from other agents. The control system may be in a blocked state until the first agent (e.g., a robot) has completed a task and sends an acknowledgement response. When two agents (e.g., a first robot and a second robot, a first robot and a human worker) have joint access (e.g., access at overlapping times) to the plurality of locations or the plurality of items. A first agent may temporarily communicate with the control system and exclude access to the control system by a second agent causing the second agent to wait.

Described herein are systems, devices, articles, and methods where one or more control systems operate synchronously but two or more associated agents (e.g., the two agents) do not cause each other to wait for completion of each other's communication or access to the control system during task completion. For example, a manipulator and an end-effector can partition a plurality of items into a plurality of locations, while another agent (e.g., mobile robot, human worker) can examine and process items in an error triage location. Both the manipulator and end-effector, and the other agent (i.e., directed agents) may receive instructions from a shared control system that communicates in a synchronous way without detrimental block(s) or wait(s).

As described herein synchronous operation of a control system may be made asynchronous by virtualization, simulation, or emulation of aspects of the control system and directed agents. In other words, the wait for acknowledgement behaviour of a control system may be removed or greatly reduced by virtualization, simulation, or emulation. For example, a simulation includes simulation or emulation of aspects of an agent; an agent and a set of tasks; and communication from the control system. An overview of synchronous control systems with two or more associated agents that do not cause each other to wait (e.g., block each other) is found in relation to FIG. 7. Examples of first and second agents are described in relation to, at least, FIGS. 1, 2, and 4-6. Examples of virtualization, simulation, or emulation of aspects an agent; an agent and a set of tasks; and communication from the control system are described in relation to, at least, FIGS. 8A, 8B, 9A and 9B. An example of further interaction with a control system is described in relation to, at least, FIG. 12.

FIG. 1 shows an exemplary system 100 in accordance with the present systems, devices, articles, and methods. Various components of system 100 are optional. As shown, system 100 includes robot 102-1 and robot 102-2 (collectively 102). Robots 102 may be associated with, e.g., communicatively coupled to, one or more optional operator interfaces, e.g., optional operator interface 104. Optional operator interface 104 may include one or more displays and input devices. System 100 includes a computer system 106, an example of a processor-based device. While illustrated as a pair of robots 102 and computer system 106, various implementations can include a greater number of robots (102) and/or computer systems (106). In some implementations, system 100 includes a nontransitory computer- and processor-readable data store or storage device 110.

Robots 102 and computer system 106 are communicatively coupled via a network or non-network communication channel 108. Examples of a suitable network or non-network communication channel 108 include a wire based network or communication channel, optical based network or communication channel, wireless network or communication channel, or a combination of wired, optical, and/or wireless networks or communication channels.

A human operator 105 at operator interface 104 can selectively pilot one or both of robots 102. In human operator controlled (or piloted) mode, the human operator observes representations of sensor data, for example, video, audio, or haptic data received from one or more environmental sensors or internal sensors. The human operator then acts, conditioned by a perception of the representation of the data, and creates information or executable instructions to direct robots 102 or other robot(s). Robots 102 operate in, and receive data about, an environment 140 that comprises a physical space. The term "about" is employed here in the sense of represent, characterize, or summarize. The data about an environment 140 is received from one or more sensors. In some implementations, the one or more sensors are on or otherwise carried by robots 102. In some implementations, the one or more sensors are external to or separate from robots 102, such as, camera 156, microphone 158.

In piloted mode, robots 102 execute robot control instructions in real-time (e.g., without added delay) as received from the operator interface 104 without taking into account or revision by the controller based on sensed information.

In some implementations, robots 102, operate without an operator interface 104 or human operator, e.g., autonomously. Robots 102 may operate in an autonomous control mode by executing autonomous control instructions. For example, computer system 106 or robots 102 can use sensor data from one or more sensors associated with operator generated robot control instructions and the operator generated robot control instructions from one or more times robots 102 was in piloted mode to generate autonomous robot control instructions for subsequent use. For example, by using deep learning techniques to extract features from the sensor data such that in autonomous mode the robots 102 autonomously recognize features and/or conditions in its environment and in response perform a defined act, set of acts, a task, or a pipeline of tasks. Exemplary acts include recognizing the presence of a red ball, or any colour ball, depending on the features extracted from the sensor data, and kicking the ball. In the absence of a ball, the robot executing the autonomous robot control instructions would not kick the air as if a ball was present.

In some implementations, the computer system 106 is a smaller processor based device like a mobile phone, single board computer, embedded computer, and the like. The computer system 106 may, in some instances, be termed or referred to interchangeably as a computer, server, or an analyzer 106. Computer system 106 may create autonomous control instructions for robots 102 or another robot. In some implementations, robots 102 autonomously recognize features and/or conditions in the surrounding environment as represented by a representation (e.g., presentation, depiction) of the environment and one or more virtual items composited into the environment, and in response to being presented with the representation perform one or more actions or tasks.

In some implementations, the computer system 106 includes at least one nontransitory computer- or processor-readable medium (e.g., nonvolatile memory for instance ROM, FLASH EEPROM, volatile memory for instance RAM, spinning media for instance a magnetic hard disk, optical disks) that stores processor-executable instructions, which when executed by at least one processor included in computer system 106 cause the at least one processor to define in part a control system for robots 102 and other agents. For example, computer system 106 may provide an application program interface (API) via which robots 102 or other agents can provide queries to and receive processor-executable instructions or processor-readable data in response. For example, computer system 106 may include a warehouse control system. A warehouse control system includes processor executable instructions, that in response to being executed, controls automated systems such as sortation systems, AS/RS, unmanned ground vehicles (UGVs), automatic guided vehicles (AGVs), sorters, and conveyors in the warehouse. The warehouse control system may direct "real-time" activities within warehouses and distribution centers. For example, a warehouse control system direct robots and workers, e.g., a conveyor or dispatch a AGV, or (de)activate a light in a pick to light system.

In some instances, robots 102 may be controlled autonomously at one time, while being piloted, operated, or controlled by a human operator at another time. That is, operate under an autonomous control mode and change to operate under a piloted mode (i.e., non-autonomous). In a third mode of operation robots 102 can replay or execute piloted robot control instructions in a human operator controlled (or piloted) mode. That is operate without sensor data and replay pilot data.

A robot, like robots 102, is an electro-mechanical machine controlled by circuitry, for example circuitry that includes a processor that executes and follows processor-executable instructions; a human operator controllable electro-mechanical machine; a robotic subsystem (or apparatus) of another machine including a robot; or the like. A robot performs physical acts, actions, or tasks, for example, working with tangible results and/or computational tasks. A robot has the ability to move in a physical space, such as environment 140, to accomplish physical tasks. As well, a robot includes computational resources, on-board and/or remote computational resources, to perform computational tasks. The computational tasks can be in aid of the physical tasks, e.g., planning, as a task, for accomplishing a tangible result to physical task. A robot has the ability to acquire information from sensors, on-board and/or remote sensors. A robot can be part of or included in a larger system like system 100.

A robot typically includes a propulsion or motion subsystem comprising of one or more motors, solenoids or other actuators, and associated hardware (e.g., drivetrain, wheel(s), treads) to propel the robot in a physical space. An example of a motion subsystem is a set of drivetrain and wheels, such as, drivetrain and wheels 152 of robot 102-1, 102-2, respectively. The space does not need to be horizontal or terrestrial. Examples of spaces include water, air, underground, vertical spaces, outer space and the like. The robots 102 may operate in distribution centre, stock room, or warehouse. These include a tangible place of storage for products. Principal warehouse activities include receipt of items, storage, order picking, and shipment.

A robot typically includes a manipulation subsystem comprising one or more appendages, such as, one or more arms and/or one or more associated end-effectors, arm and end-effector 154 of robot 102-1, 102-2. An end-effector is a device attached to a robotic arm designed to interact with the environment. End-effectors for robot operating in unstructured environments are devices of complex design. Ideally, these are capable of performing many tasks, including for example grasp, grip, physically releasably engage, or otherwise interact with an item.

System 100 includes a sensor subsystem comprising one or more sensors, such as, one or more imagers or cameras 156, and/or one or more microphones 158. (Robots 102 may include an onboard sensor subsystem. See examples, disclosed herein at, at least, FIG. 2.) A sensor subsystem which acquires data that characterizes or represents the robots 102 in a context or scenario, and/or performing one or more tasks. The data includes environmental sensor information, or environment information, representative of environmental conditions external to robots 102.

System 100 includes a worker interface system. System 100 includes one or more worker interfaces 160 coupled to network or non-network communication channel 108. The worker interfaces 160 include input or output parts. An example of an output part is a display which can present explanatory text or a dynamic representation of robots 102 in a context or scenario. The explanatory text may include a declarative component, i.e., message or directive to a worker 161 to complete some task. For example, a dynamic representation robot includes video and audio feed, for instance a computer-generated animation. Useful video and audio formats include H264 and Opus respectively. Example of an input part includes a WIMP interface, and a scanner, e.g., which in response to a scan of a barcode or the like provides an item number or identifier. A worker 161 may observe or monitor the operation of system 100, robots 102 or the like from worker interfaces 160. The worker 161 may engage in the operation of system 100 via worker interfaces 160.

Figure 2:
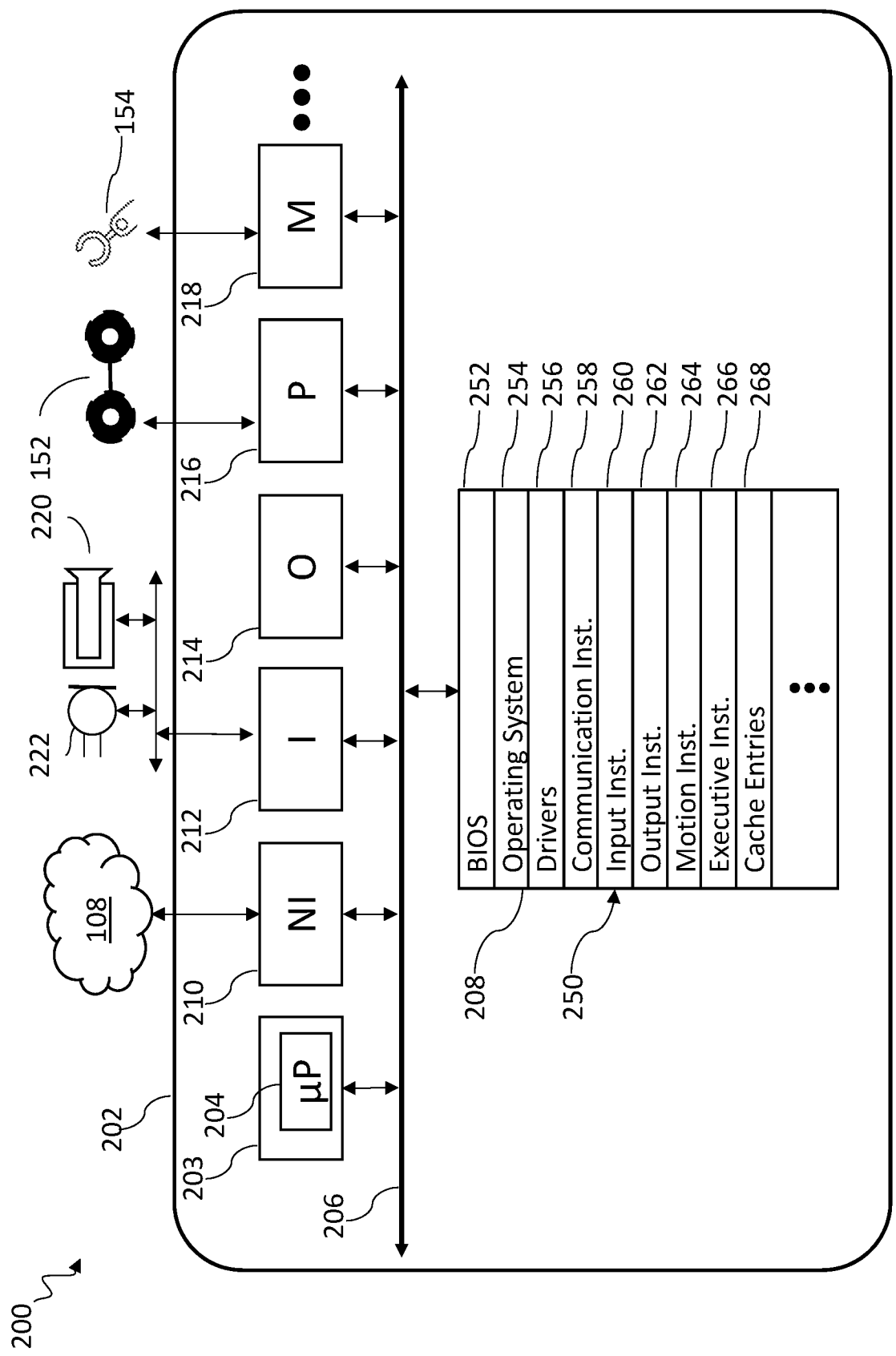
FIG. 2 is a schematic diagram illustrating an exemplary robot suitable for inclusion in the system of FIG. 1.

FIG. 2 schematically shows parts of a robot 200, including a processor, for use in the system 100, shown in FIG. 1, in accordance with the present systems, devices, articles, and methods. Robot 200 includes at least one body or housing 202, and a control subsystem 203 that includes at least one processor 204, at least one nontransitory computer- and processor-readable storage device 208, and at least one bus 206 to which, or by which, the at least one processor 204 and storage device(s) 208 are communicatively coupled. In some implementations, robot 200 comprises a sub-set of the illustrated robot 200, including control subsystem 203, bus(es) 206, storage device(s) 208, and network interface subsystem 210.

Robot 200 includes a network interface subsystem 210, e.g., a network interface device, that is communicatively coupled to bus(es) 206 and provides bi-directional communication with other systems (e.g., external systems external to the robot 200) via a network or non-network communication channel 108. The network interface subsystem 210 includes one or more buffers. Network interface subsystem 210 receives and sends processor-readable information related to a plurality of items, e.g., processor-executable instructions or specifications on how to process the plurality of items. Network interface subsystem 210 allows robot 200 to be communicatively coupled to a control system via an application program interface, e.g., an application program interface in system 106. Network interface subsystem 210 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI™ compliant, BLUETOOTH® compliant, cellular (e.g., GSM, CDMA), and the like. Suitable transportation protocols include TCP/IP, SCTP, and DCCP.

Robot 200 includes an input subsystem 212 comprising one or more sensors that detect, sense, or measure conditions or states of robot 200 and/or conditions in the environment in which the robot operates, and produce or provide corresponding sensor data or information. Such sensors include cameras or other imagers, touch sensors, load cells, pressure sensors, microphones, meteorological sensors, chemical sensors or detectors, or the like.

Robot 200 includes an output subsystem 214 comprising output devices, such as, speakers, lights, and displays. Input subsystem 212 and output subsystem 214, are communicatively coupled to processor(s) 204 via bus(es) 206. In some implementations, input subsystem 212 includes receivers to receive position and/or orientation information. For example, a global position system (GPS) receiver to receive GPS data, two more time signals for the control subsystem 203 to create a position measurement based on data in the signals, such as, time of flight, signal strength, or other data to effect a position measurement. Also for example, one or more accelerometers can provide inertial or directional data in one, two, or three axes.

Robot 200 may include a propulsion or motion subsystem 216 comprising motors, actuators, drivetrain, wheels, and the like to propel or move the robot 200 within a physical space and interact with it. The propulsion or motion subsystem 216 propulsion or motion subsystem comprises of one or more motors, solenoids or other actuators, and associated hardware (e.g., drivetrain, wheel(s), treads), to propel the robot in a physical space. For example, the propulsion or motion subsystem 216 includes drive train and wheels 152.

Robot 200 includes a manipulation subsystem 218, for example comprising one or more arms, manipulators, end-effectors, associated motors, solenoids, other actuators, linkages, drive-belts, and the like coupled and operable to cause the arm(s) and/or end-effector(s) to move within a range of motions. The manipulation subsystem 218 is communicatively coupled to the processor(s) 204 via bus(es) 206. For example, manipulation subsystem 218 includes arm and end-effector 154.

A person of ordinary skill in the art will appreciate the components in robot 200 may be varied, combined, split, omitted, or the like. In some implementations one or more of the network interface subsystem 210, input subsystem 212, output subsystem 214, propulsion or motion subsystem 216 and/or manipulation subsystem 218 are combined. In some implementations, one or more of the subsystems (e.g., input subsystem 212) are split into further subsystems. In some implementations, bus(es) 206 is a plurality of buses (e.g., data buses, instruction buses, power buses) included in at least one body. For example, as part of a modular computing architecture where computational resources at distributed over the components of robot 200. That is, a robot, like robot 200, could in some implementations, have a processor in a left arm and a storage device in its thorax. In some implementations, computational resources are located in the interstitial spaces between structural or mechanical components of the robot 200. A data storage device could be in a leg and a separate data storage device in another limb. In some implementations, the computational resources distributed over the body include redundant computational resources.

The at least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The at least one processor 204 may be referred to in the singular, but may be two or more processors.

The at least one storage device 208 is at least one nontransitory or tangible storage device. In some implementations, storage device(s) 208 includes two or more distinct devices. The storage device(s) 208 can, for example, include one or more volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), hard disk drive (HDD), network drive, flash memory, digital versatile disk (DVD), any other forms of computer- and processor-readable memory or storage medium, and/or a combination thereof. Storage can be read only or read-write as needed. Further, modern computer systems and techniques conflate volatile storage and non-volatile storage, for example, caching, using solid-state devices as hard drives, in-memory data processing, and the like.

The at least one storage device 208 includes or stores processor-executable instructions and/or processor-readable data 250 associated with the operation of robot 200, system 100, and the like. Herein processor-executable instructions or data includes processor-executable instructions and/or processor-readable data. Herein and associated drawings instructions includes processor-executable instructions and/or processor-readable data.

The execution of the processor-executable instructions or data cause the at least one processor 204, or control subsystem 203, to carry out various methods and actions, for example via the propulsion or input subsystem 212, and/or manipulation subsystem 218. The processor(s) 204 can cause a robot, such as robot 200, to carry out various methods and actions, e.g., identify and manipulate items. Processor-executable instructions and/or processor-readable data 250 can, for example, include a basic input/output system (BIOS) 252, an operating system 254, drivers 256, communication instructions or data 258, input instructions or data 260, output instructions or data 262, motion instructions or data 264, executive instructions or data 266, and cache entries 268.

Exemplary operating systems for operating system 254 include ANDROID™, LINUX®, and WINDOWS®. The drivers 256 include processor-executable instructions or data that allow processor(s) 204 to control circuitry of robot 200. The processor-executable communication instructions or data 258 include processor-executable instructions or data to implement communications between the robot 200 and an operator console or terminal, a computer, or the like. The processor-executable input instructions or data 260 guide robot 200 in processing input from sensors in input subsystem 212. Processor-executable output instructions or data 262 guide the robot 200 in interacting within the environment via components of manipulation subsystem 218 or output subsystem 214. Processor-executable motion instructions or data 264 guide robot 200 in moving within its environment via components in propulsion or motion subsystem 216. For example, processor-executable motion instructions or data 264 may aid robot 200 in performing: motion plan creation, inverse kinematics, or other motion related tasks. Processor-executable motion instructions or data 264 may implement, in part, various methods described herein, including those in and in relation to FIGS. 9A, 9B, 10, and 11.

The processor-executable executive instructions or data 266 guide the robot 200 to reasoning, problem solve, plan tasks, performing tasks, and the like. The processor-executable executive instructions or data 266 may implement, in part, error triage, described herein in relation to, at least, FIGS. 6, 9A, 9B, and 11. The processor-executable executive instructions or data 266 may implement, in part, various methods described herein, including those in and in relation to FIGS. 9A, 9B, 10, 11, and 12. The cache entries 268, includes processor-executable executive instructions or processor-readable data, and comprise a plurality of cache entries. A respective cache entry in the plurality of cache entries includes, for example, an item number and an associated output state. Examples of item numbers and output states are described herein in relation to, at least, FIGS. 7, 8A, 8B, 9A and 9B.

Input subsystem 212 comprises sensors or transducers that acquire data for the robot. The data includes sensor information. Sensor information includes environmental sensor information representative of environmental conditions external to robot 200. Sensor information includes robotic conditions or state sensor information representative of conditions or states of the robot including the various subsystems and components thereof. Such sensors may include one or more of cameras or imagers (e.g., responsive in visible and/or nonvisible ranges of the electromagnetic spectrum including for instance infrared and ultraviolet), radars, sonars, touch sensors, pressure sensors, load cells, microphones, meteorological sensors, chemical sensors, or the like. Exemplary sensors include camera 220 and microphone 222. Sensor information can, for example, include diagnostic sensor information that is useful in diagnosing a condition or state of the robot 200 or environment in which robot 200 operates. For example, such sensors may include contact sensors, force sensors, strain gages, vibration sensors, position sensors, attitude sensors, accelerometers, and the like. In some implementations, the diagnostic sensors include sensors to monitor a condition and/or health of an on-board power source (e.g., battery array, ultra-capacitor array, fuel cell array).

The output subsystem 214 comprises one or more output devices. The output subsystem 214 allows robot 200 to send signals into the robot's environment. Example output devices are speakers, displays, lights, and the like. Robot 200 may communicate with an agent, such as, a person, and another robot.

Figure 3:
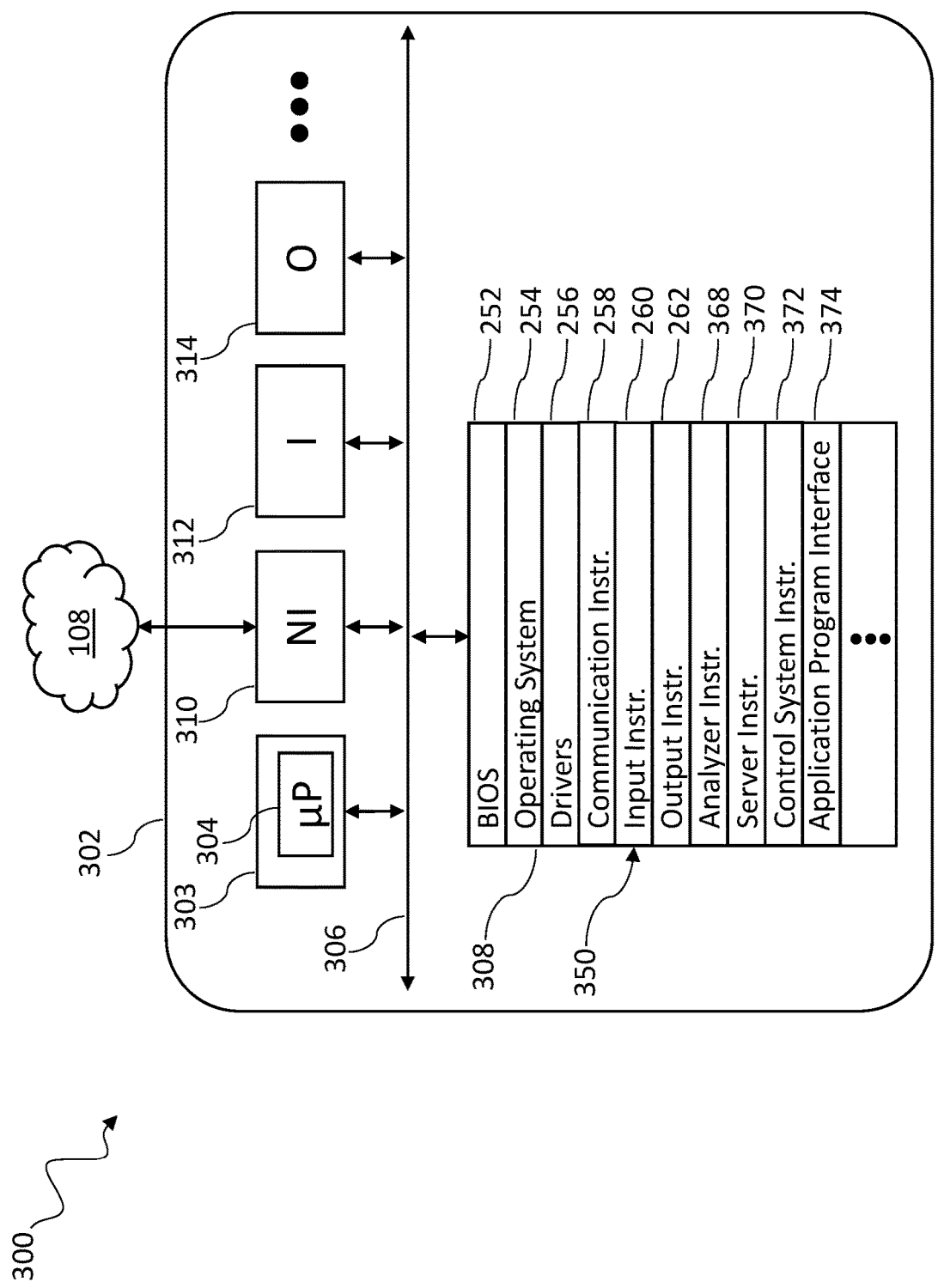
FIG. 3 is a schematic diagram illustrating an exemplary processor-based device suitable for inclusion in the system of FIG. 1.

FIG. 3 schematically shows exemplary parts of a system 300, including a processor, that may be used as computer system 106 in FIG. 1. System 300 shares some similar components with robot 200 but typically differs in lacking the propulsion or motion sub-system and the manipulation sub-system. System 300 has different components within some sub-systems, such as, an input subsystem 312 and output subsystem 314.

System 300 includes at least one body or housing 302, and a control subsystem 303 that includes at least one processor 304, at least one nontransitory computer- or processor-readable storage device 308, and at least one bus 306 to which the at least one processor 304 and the at least one nontransitory computer- or processor-readable storage device 308 are communicatively coupled. System 300 includes a network interface subsystem 310 is communicatively coupled to bus(es) 306 and provides a bi-directional communicative coupler among system 300 and other systems (e.g., processor-based devices associated with warehouse management systems, online storage providers) via network or non-network communication channel 108.

System 300 includes an input subsystem 312. Input subsystem 312 may include one or more user interface input devices, such as, a touch display, a keyboard, a mouse or other pointer device, a microphone, and a camera. In some implementations, input subsystem 312 is coupled to control subsystem 303 via network interface subsystem 310. In some implementations, input subsystem 312 includes one or more sensors such as environmental sensors.

System 300 includes an output subsystem 314 comprising one or more output devices, such as, displays, speakers, and lights. Input subsystem 312 and output subsystem 314, are communicatively coupled to the processor(s) 304 via bus(es) 206.

Storage device(s) 308 includes or stores processor-executable instructions or data 350 associated with the operation of system 300, or system 100. Processor-executable instructions or data (even reference numbers 252-262) are described herein and with appropriate changes are applicable to system 300, e.g., absence of a motion subsystem. In various implementations, storage device(s) 308 includes or stores one or more of: processor-executable analyzer instructions or data 368, processor-executable server instructions or data 370, processor-executable control system instructions or data 372; and processor-executable application program interface instructions or data 374. The processor-executable analyzer instructions or data 368, processor-executable server instructions or data 370, processor-executable control system instructions or data 372; and processor-executable application program interface instructions or data 374 may implement, in part, various methods described herein, including those in and in relation to FIGS. 8A-12.

Processor-executable analyzer instructions or data 368, when executed by control subsystem 303, generates autonomous robot control instructions. Processor-executable server instructions or data 370, when executed by processor(s) 304, guide system 300 to coordinate the operation of system 100, and/or to act as a mediator between robots 102, computer system 106, and the like.

The processor-executable control system instructions or data 372 may include processor-executable instructions, that in response to being executed, controls automated systems, such as, robot 102, robot 200, sortation systems, AS/RS, autonomous guided vehicles (AGVs), sorters, and conveyors in the warehouse. The processor-executable control system instructions or data 372, may, when executed, direct "real-time" activities within warehouses and distribution centers. For example, the processor-executable control system instructions or data 372 may direct robots (e.g., device 400 described in relation to at least FIG. 4) and workers. The processor-executable control system instructions or data 372 may operate a conveyor or dispatch a AGV, or (de)activate a light in a pick to light system, e.g., lights on device 400 described herein. The processor-executable control system instructions or data 372, may when executed, receive from one or more agents (e.g., a robot) an item identifier or number, and send, in response, processor-readable information that specifies an output state (e.g., a stow location) for the item associated with the item number.

The processor-executable application program interface instructions or data 374, also called an API, may include processor-executable instructions, that in response to being executed, provide a location where a control system, e.g., the processor-executable control system instructions or data 372, may interact with one or more agents. For example, via the API, the control system may receive from one or more agents an item identifier or number, and provide a response to the one or more agents. For example, a query is received via the API and a response is sent via the API while the control system, e.g., processor executing processor-executable control system instructions or data 372, processes the query. The processor-executable application program interface instructions or data 374, when executed define, an application program interface, or a place of interaction between two systems or devices so that they can operate jointly. The application program interface instructions or data 374 may include a first set of processor-executable instructions that enables interaction with a second or further sets of processor-executable instructions. The application program interface instructions or data 374 may include subset of processor-executable instructions in a first set of processor-executable instructions used by second set of processor-executable instructions to direct the performance of one or more operations by the first set of processor-executable instructions, an operating system for a processor-based device executing the first set of processor-executable instructions, or the processor-based device, or a peripheral device to the processor-based device.

Figure 4:
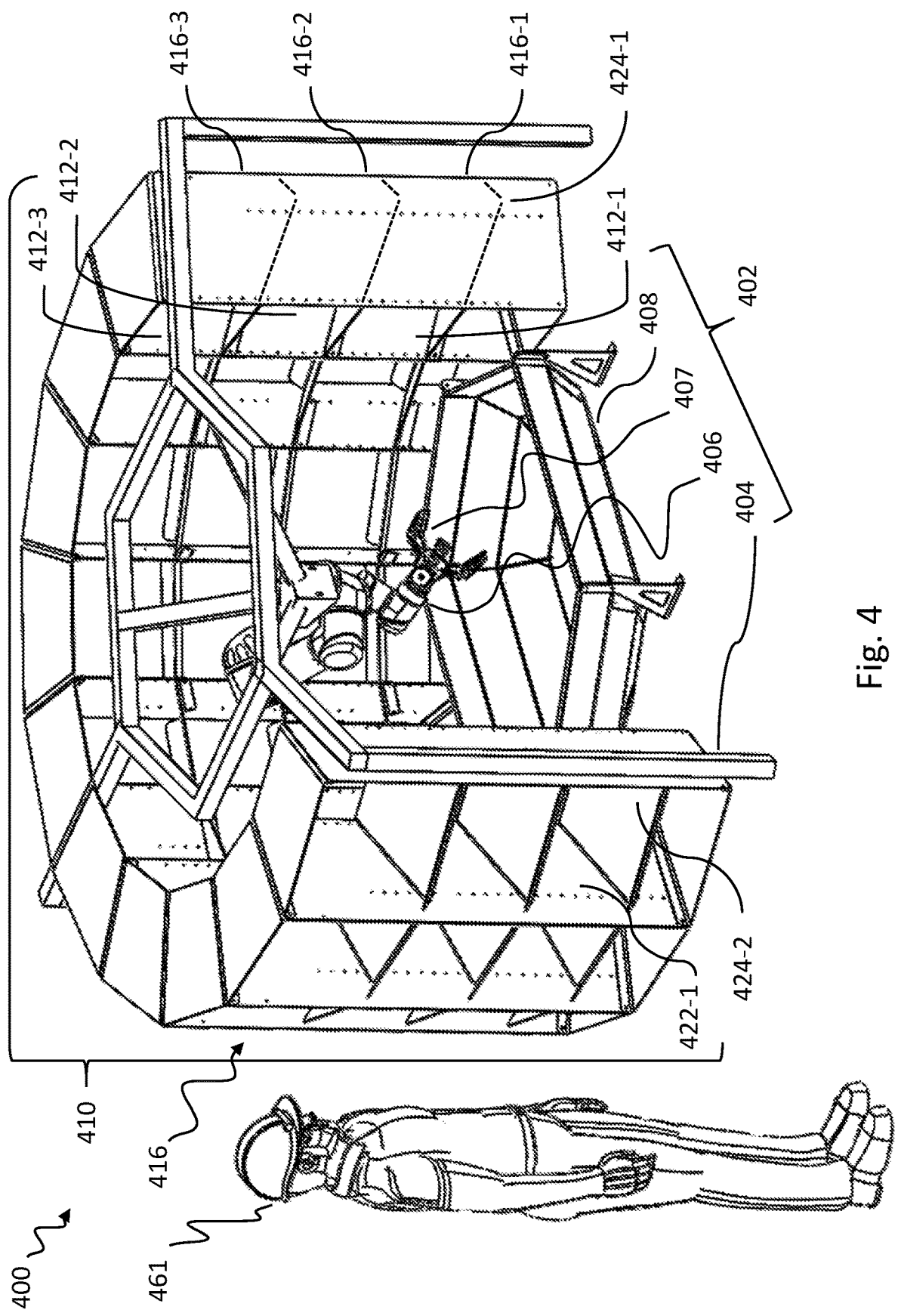
FIG. 4 illustrates, in a perspective view, an exemplary device that includes at least one end-effector, reception areas, and extraction areas.
Figure 5:
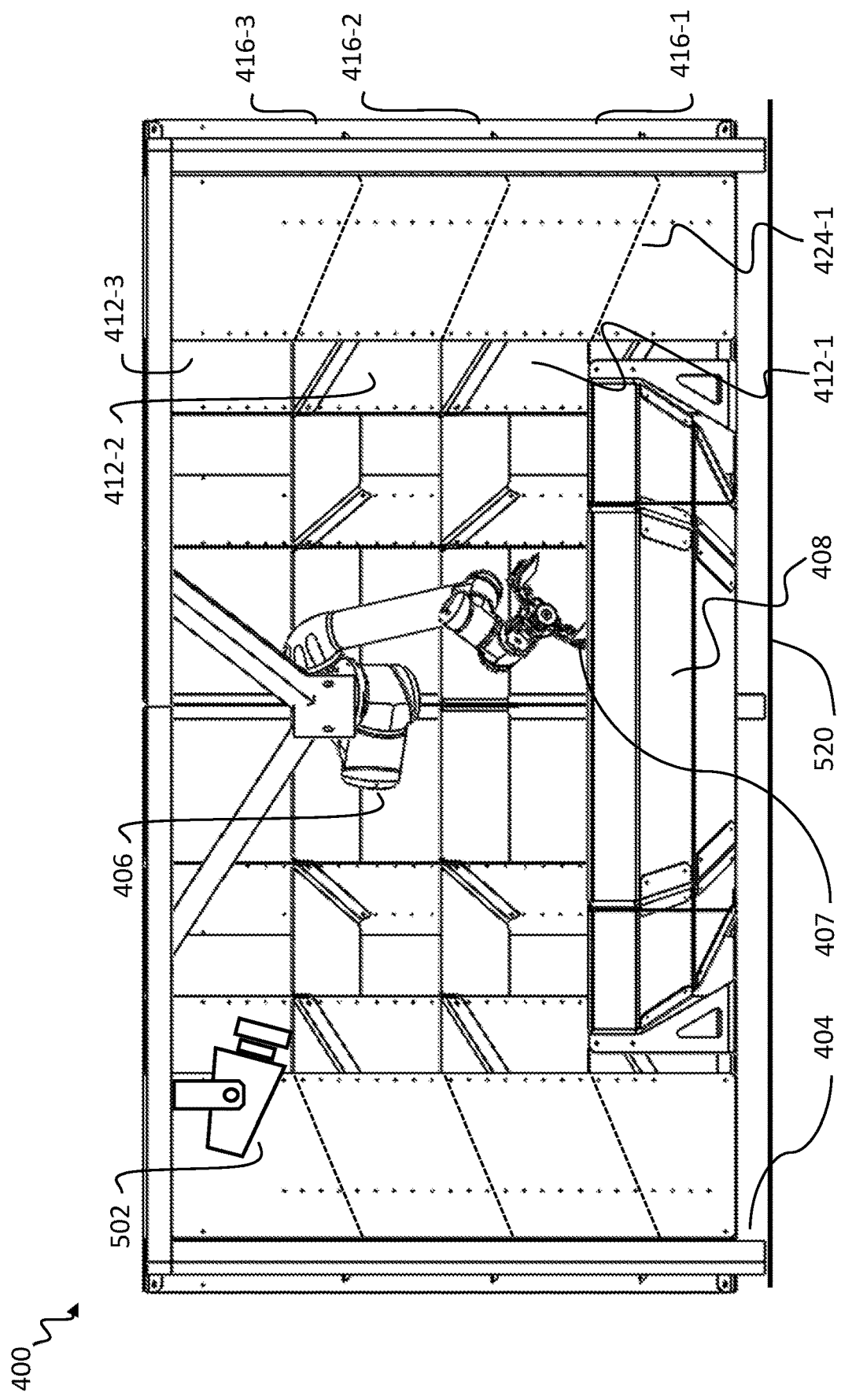
FIG. 5 illustrates, in elevation view, the device shown in FIG. 4.
Figure 6:
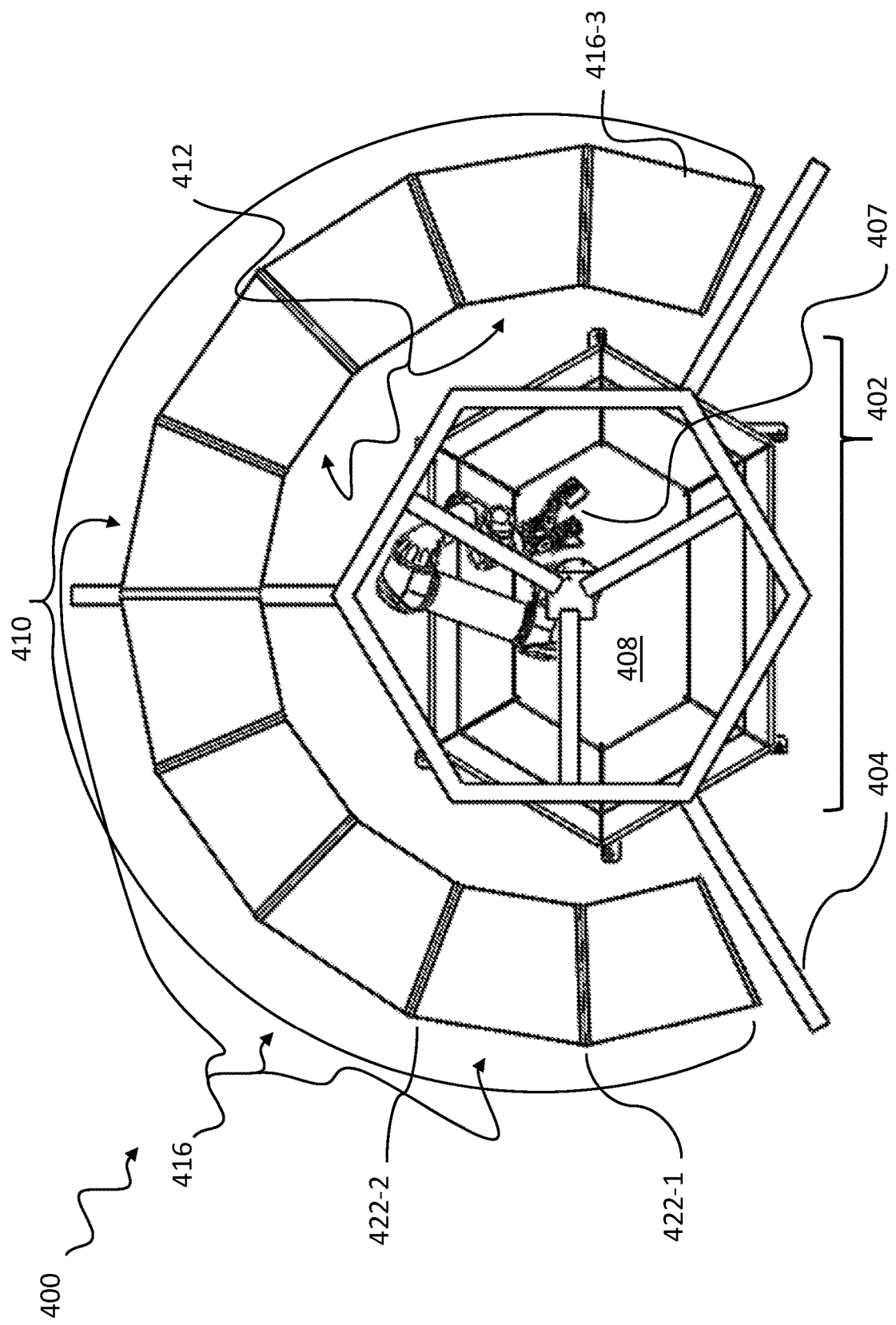
FIG. 6 illustrates, in plan view, the device shown in FIG. 4.

FIG. 4 illustrates, in a perspective view, an exemplary device 400 in accordance with the present systems, methods, and articles. FIG. 5 is an elevation view of device 400, and FIG. 6 is a plan view of device 400. Some components included in one view are not shown in a corresponding view.

FIG. 4 illustrates, in a perspective view, an exemplary device 400, along with a human worker 461. Device 400 includes at least one end-effector 407.

Device 400 includes an input part 402 and an output part 410. In some implementations, input part 402 includes a frame 404 which may be coupled or connected to a base, e.g., floor, ground, or platform. One or more multi-joint manipulators 406, e.g., robotic arm, may be coupled or connected to frame 404. Manipulator(s) 406 may couple to at least one end-effector 407 distally disposed on manipulator(s) 406 relative to frame 404. Herein device 400 and methods described herein are described as being performed by manipulator and end-effector. However, device 400 and methods described herein, such as method 1000, may include at least one manipulator or end-effector.

The manipulator(s) 406 and associated end-effector(s) 407 may move articles, work pieces, or items to, from, and within input space 408. Input space 408 may be disposed proximate to end-effector(s) 407 such that end-effector(s) 407 may grasp workpieces or items in input space 408. The end-effector(s) 407 and associated manipulator(s) 406 may move workpieces or items to, from, and around output space 410. The output space may include a plurality of reception spaces 412 (e.g., cubbies) that may be accessed from the opposite side 416.

Manipulator(s) 406 may couple to at least one end-effector 407 distally disposed on manipulator(s) 406 relative to frame 404. Herein device 400 and methods 800, 900, 1000, et seq. are described as being performed by manipulator and end-effector. However, device 400 and methods described herein may include at least one manipulator or end-effector.

The manipulator(s) 406 and associated end-effector(s) 407 may move items to, from, and within input space 408. Input space 408 may be disposed proximate to end-effector(s) 407 such that end-effector(s) 407 may grasp workpieces or items in input space 408. The end-effector(s) 407 and associated manipulator(s) 406 may move workpieces or items to, from, and around input space 408.

A plurality of items may be disposed in input space 408. The plurality of items may be referred to as a batch or group, may be of two or more types, or may be associated with two or more specified or defined, partitions (i.e., parts) of the plurality of items. The plurality of items item may be added to input space 408 in tranches, e.g., one container at a time with intervening action by at least one processor or end-effector(s) 407. Device 400 may be used in a way such that as successive items are added to items already present in input space 408 the addition of items is regarded as correct when the added items partially or fully complete the batch. That is, when one or more items are present in input space 408 a correct procedure could be to only allow addition of further items to input space 408 when the further items complete the batch. For example, two containers may be placed or dumped into an input space 408. One human worker 461 could provide the two containers or two different workers to provide the two containers including items. There could be some or no time separation between the adding items from the two containers.

Device 400 includes a plurality of reception spaces 412-1, 412-2, 412-3 (only three called out for clarity of drawing, collectively 412) proximate to input space 408 and manipulator(s) 406. For example, the end-effector(s) 407 and associated manipulator(s) 406 may be moveable to be at least proximate with the plurality of reception spaces 412. The end-effector(s) 407 and associated manipulator(s) 406 may move items from input space 408 to the plurality of reception spaces 412, or to, from, and around in input space 408. The end-effector(s) and associated manipulator(s) 406 may grasp a first respective item from a plurality of items in input space 408. The end-effector(s) 407 and associated manipulator(s) 406 may transfer the first respective item to a first reception space in the plurality of reception spaces 412, e.g., reception space 412-1. The end-effector(s) 407 and associated manipulator(s) 406 may grasp a second respective item from the plurality of items, and may transfer the second respective item to the first reception space (e.g., reception space 412-1) or a second reception space (e.g., reception space 412-2, or 412-3).

Device 400 may include a plurality of extraction spaces 416-1, 416-2, 416-3 (only three called out for clarity of drawing, collectively 416). The plurality of extraction spaces 416 may correspond to (e.g., one to one) the plurality of reception spaces 412. For example, reception space 412-1 may correspond to extraction space 416-1, for instance the reception space 412-1 corresponding extraction space 416-1 may be coupled via a passage therebetween or otherwise provide access for items placed in the reception space 412-1 to transit to the corresponding extraction space 416-1. That is an item transferred from input space 408 to reception space 412-1 may be retrieved from extraction space 416-1. The plurality of extraction spaces 416 may overlap to (e.g., one to one) the plurality of reception spaces 412. A pair of one reception space and one extraction space may include an overlapping volume or area. The one reception space may be accessed via a first opening and the one extraction space may be accessed via a second opening.

Device 400 may include a plurality of septums 422-1 (only one called out for clarity of drawing). A respective septum, e.g., septum 422-1, may be disposed between and separate a respective pair of reception spaces 412, or a respective pair of extraction spaces 416. That is, a septum 422-1 may define a boundary between a pair of spaces, e.g., separate a respective pair of reception spaces 412, a respective pair of extraction spaces 416, or a reception space and an extraction space.

Device 400 may include a plurality of slides 424-1, 424-2 (only two called out for clarity of drawing, collectively 424). A respective slide, e.g., slide 424-1, may be disposed between and couple a reception space and an extraction space, e.g., reception space 412-1 and extraction space 416-1. That, is a slide included in the plurality of slides 424 may allow for one or more items to be transferred (e.g., slide) from a reception space and a corresponding extraction space. The slide may be arranged such that end-effector(s) 407 may release an item in a reception space and a worker (e.g., robot 200 or human worker 461) may extract or retrieve the item from a corresponding extraction space.

FIG. 5 shows an exemplary arrangement of frame 404, manipulator(s) 406, end-effector(s) 407, input space 408, reception spaces 412, and extraction spaces 416. FIG. 5 illustrates device 400 in elevation view from a point near the bottom right corner of FIG. 4. The reception spaces 412 are in a position superior to input space 408. However, the reception spaces 412 may be positioned even with or below input space 408. Manipulator(s) 406 may hang from frame 404, extend from a pedestal to be moveably proximate to input space 408 and the reception spaces 412.

Device 400 may include a plurality of slides 424. For example, slide 424-1 may be disposed between and couple reception space 412-1 and extraction space 416-1. Slide 424-1 may passively allow for one or more items to be transferred from reception space 412-1 to extraction space 416-1, for example under influence of the force of gravity. That is an item may slide, roll, or fall from reception space 412-1 to extraction space 416-1 and the may be item in contact with slide 424-1 as it slides, rolls, or falls.

Device 400 may include at least one sensor or transducer, for example, camera 502 or other imager. The at least one sensor may include one or more sensors that detect, sensor, or measure conditions or states of device 400 and/or conditions in the environment to device 400, and provide corresponding sensor data or information including information about the state of input space 408, reception spaces 412, and extraction spaces 416. Such sensors or transducers include cameras or other imagers, bar code scanners, touch sensors, load cells, pressure sensors, microphones, RFID readers or interrogators or radios, or the like. The at least one sensor or transducer may be arranged in a sensor subsystem communicatively coupled to at least one processor.

One or more parts of device 400 may be coupled to, e.g., rest on, be affixed to, a platform 520. Human worker 461 may stand on platform 520 or a platform above or below platform 520.

FIG. 6 illustrates, in plan view, device 400 including an exemplary arrangement frame 404, input part 402, input space 408, output part 410, reception spaces 412, and extraction spaces 416. As illustrated, output part 410 including reception spaces 412 may wrap or curve around part of input part 402 including input space 408. Output part 410 including extraction spaces 416 may wrap or curve around part of input part 402. Thus, the device 400 may have an annular shape or partial annular shape or profile, for instance as viewed from a top of the device looking directly down at the device.

Device 400 may include an error cubby or extraction space, such as, extraction space 416-3. The extraction space 416-3 may be used to contain error items. For example, when device finds an unidentifiable item in input space 408, the manipulator 406 and end-effector 407 may place the unidentifiable item in extraction space 416-3. A second agent (e.g., a robot or human worker) may find an item mistakenly placed or forgotten in an extraction space in extraction space 416-3. Items in extraction space 416-3 may be processed by a second agent, such as, a robot or a human worker, to perform error triage. In error triage the second agent may direct the items in extraction space 416-3, those items also known as error items, to an appropriate location in device 400 or an ancillary container or location. The second agent may perform error triage by exchanges of queries and responses with a control system and a storage device. Examples of queries and responses are described herein in relation to, at least, FIGS. 7, 8, and 9B.

Device 400 may include an output device (not shown) communicatively coupled to at least one processor, e.g., processor(s) 304. The at least one processor may direct the output device display of one or more visual indications associated with one or more extraction space. The visual indication may convey information representing or defining a space status for respective extraction space or associated part of a plurality of parts. The space status may be a null, complete, incomplete, in process, or the like. The visual indication may convey a part is complete or incomplete. The visual indication may be based on the processor-readable information, such as, processor-readable error information that represents an incomplete space status, or the processor-readable completion information that represents a complete space status. The at least one processor may operator, e.g., selectively operate the output device in response to execution of processor-executable instructions. In various implementations, the at least one processor may generate a signal that includes processor-readable error information that represents space status information.

Device 400 may include, as or in an output device, one or more lights proximately disposed to the respective extraction space (not shown) and communicatively coupled to the at least one processor, e.g., processor(s) 304. Device 400 may include a plurality of lights disposed on device 400 in location near extraction spaces 416. Device 400 may include as or in an output device an augmented reality display for an observer (e.g., robot or worker 461). and communicatively coupled to the at least one processor. An example of an augmented reality display are shown in FIG. 1 at operator interface 104. The augmented reality display may be a display headset including a display and attitude or direction sensor, such as, an OCULUS RIFT™, or ALTERGAZE™, available, respectively, from Oculus VR of Menlo Park, Calif., US; and Altergaze Ltd of London, UK. Device 400 may include as or in the output display in communication with the at least one processor, e.g., part of worker interfaces 160 shown in FIG. 1. Operation of one or more output devices is described herein at, at least, FIG. 3.

Figure 7:
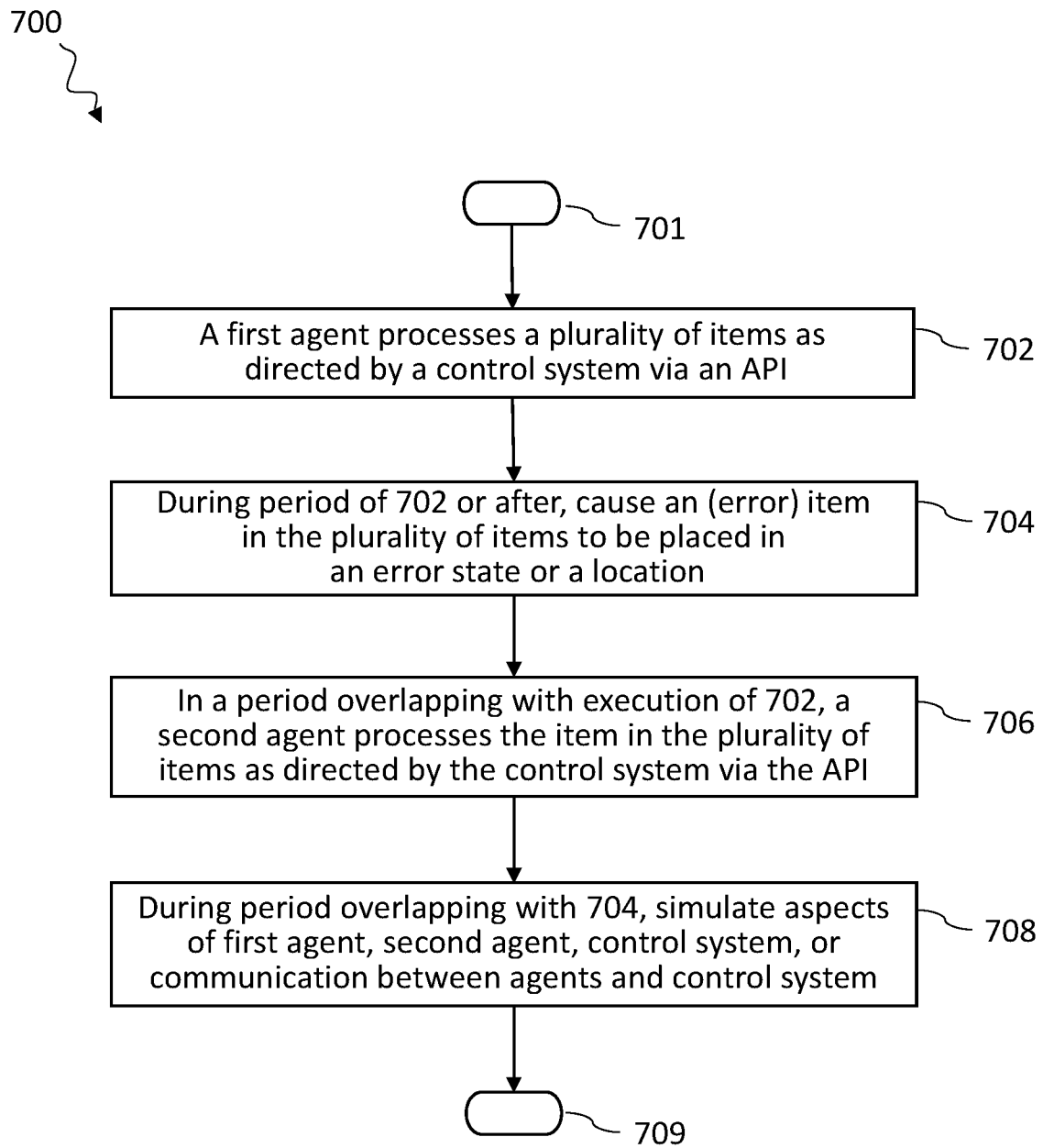
FIG. 7 is a flow-diagram of an implementation of a method of operation in a system including two agents that process a plurality of items.

FIG. 7 shows method 700 controlled by circuitry, e.g., at least one hardware processor. Method 700 is a method of operation of a system including two agents that process a plurality of items. Method 700, in part, controls how two agents and a control system interact with a plurality of items. Those of skill in the art will appreciate that other acts may be included, removed, and/or varied or performed in a different order to accommodate alternative implementations. Method 700 is described as being performed by a first agent, for example, a robot including an end-effector (e.g., device 400), a second agent, such as a robot (e.g., robot 200) or a human worker (e.g., human worker 461), and a control system (e.g., system 300 executing control system processor-executable instructions or data 372), in conjunction with other components, such as those found in system 100, computer system 106, robot 200, and system 300. For example, the control system may include or be communicatively coupled to an API and/or the control system may be communicatively coupled to one or more agents via the API. However, method 800 may be performed by multiple controllers or by another system.

Method 700 begins at 701, for example in response to a call from a routine or program, start up or an application of power to the system, or otherwise invoked. At 702, a first agent processes a plurality of items as directed by a control system via an API. For example, device 400 processes a plurality of items disposed in input space 408. The first agent during 702 queries the control system via the API for output states for one or more items. An example of an output state is a final location for the item, e.g., in device 400 reception space 412-1. The output state for an item can be a state or condition of the item, e.g., packed in box, painted, assembled in conjunction with a second item.

At 704 during a period overlapping with execution of 702 or after, the first agent or a second agent cause an (error) item in the plurality of items to be placed in an error state or a location. For example, the second agent may find a dropped item and place it in extraction space 416-3 in device 400. See further description in relation to FIG. 6.

At 706 in a period overlapping with execution of 702, a second agent processes an item in the plurality of items. The second agent is directed, at least in part, by the control system via the API. For examples, the second agent is a mobile robot, such as, robot 200. The second agent may grasp an item from extraction space 416-1 (associated with reception space 412-1) and scan the item. If the control system operates in a synchronous mode (i.e., waits for response, e.g., blocked until response), and the first agent is being directed by the control system, the second agent must wait until the control system moves from the wait state.

At 708, during period overlapping with 704, a controller can simulate aspects of first agent, second agent, control system, or communication between agents and control system. The simulation may be used by the controller to remove the effect of synchronous communication causing the second agent to wait. Examples of simulation, emulation, or virtualization are described herein at least in relation to FIGS. 8A, 8B, 9A, 9B, 10, etc. The effect of synchronous communication is further illustrated in FIGS. 8A and 8B.

In method 700, the controller can facilitate operation in system including a control system and at least two agents that communicatively access the controller. The controller can, at 702, receive, a first job set of instructions provided by the control system on behalf of a first one of the at least two agents. The controller can, in method 700, send on behalf of the first one of the at least two agents, a sham status message before actual completion of the first job specified via the first job set of instructions. The sham status message can be a success message or a fail message. In method 700, the controller may update a data store, e.g., a tangible device including non-transitory processor readable storage medium, to reflect the first job set of instructions. At 706, the controller may receive, for second one of the at least two agents, a second job set of instructions, before completion of the first job specified via the first job set of instructions. At 708, overlapping with 706, the controller may send a query to the data store for the second job set of instructions; and receive the second job set of instructions from the data store. Alternatively, at 706, the controller may send a query to the control system for the second job set of instructions; and receive the second job set of instructions from the control system. In some implementations, the data store is local to and communicatively coupled to the at least two agents. In some implementations, the data store is local to and communicatively coupled to the control system, e.g., the data store is accessed via an API as a façade to the control system and data store.

Method 700 ends at 709 until invoked again.

FIG. 8A and FIG. 8B includes interaction diagrams schematically illustrating method 800 and method 850, respectively, both methods of operation of robotic systems. Method 800 and method 850 may be compared to one another in order to visualize an effect of simulation of one or more aspects of a robotic system.

The method 800 may use or involve various components, including an application program interface 802 for a control system (not shown in FIGS. 8A and 8B), a first agent 804, and a second agent 806. A processor-based device, e.g., system 300, may include or implement the application program interface 802 (e.g., by executing the processor-executable application program interface instructions or data 374) that provides an interface to a control system defined in processor-executable instructions (e.g., control system processor-executable instructions or data 372). For example, the processor-based device via at least one processor (i.e., hardware circuitry) executes processor-executable instructions which, when executed, implement the application program interface 802. The first agent 804 may be a robot or a robotic system which includes at least one manipulator and end-effector, at least one sensor, and at least one processor. The second agent 806 may be a robot or a human worker, e.g., human worker 461.

Referring to method 800 in FIG. 8A, at 810, the first agent 804 sends a query 812 to a control system via an associated application program interface 802. The query 812 may be synchronous (as illustrated by solid arrow) or asynchronous (e.g., illustrated by open arrowhead). The query 812 includes an item number, or identifier, for an item being processed by the first agent 804. Examples of item numbers are described herein below. The query 812 includes a request for an output state for the item associated with the item number.

At 814, the application program interface 802 receives the query 812, and sends a response 816 as provided by the control system including processor-readable information that specifies an output state. An example of an output state includes a location (e.g., area, container, cubby, or shelf) within which or upon which to place (e.g., drop, leave, put, release) the instant item associated with the item number in query 812. Further examples of output states are described herein at, at least, FIGS. 7, 9A and 9B.

The first agent 804 receives the response 816 and begins the task to place the item in the output state specified in processor-readable information included in response 816. As illustrated by the hatched rectangles, many control systems operate synchronously (e.g., waits, are not responsive to queries, cannot receive queries, cannot process queries, blocks) while directing agents such as robots, conveyers, and the like. The application program interface 802 and/or associated control system waits between 814 and 822 while the first agent 804 performs a task or series of tasks.

At 818, while the application program interface 802 or associated control system waits, the second agent 806 sends query 820 to the application program interface 802. The query 820 includes an item number for an item being processed by the second agent 806 and possibly previously processed by the first agent 804. The item may, for example, be an item in an error triage reception space or cubby in device 400. However, the application program interface 802 and/or associated control system, operating synchronously, is in a wait state and query 820 does not receive a response. For example, the control system via the application program interface 802 is blocked and does not receive query 820.

At 822, the first agent 804 sends a status message 824 to the application program interface 802. The status message ends the wait state of the application program interface 802 or associated control system, e.g., block is removed. The application program interface 802 or associated control system receives and/or processes the query 820. At 826, the application program interface 802 or associated control system provides a response 828 to query 820. The response 828 includes processor-readable information that specifies an output state for the item specified in query 820. The application program interface 802 sends the response 828 in a synchronous mode that causes the application program interface 802 or associated control system to wait and not process further communications until the second agent completes a task in accordance with the response 828 as indicated by a status message.

At 830, the first agent 804 sends query 832 to the application program interface 802. The application program interface 802 or associated control system is in a wait state, e.g., is blocked, by the second agent between times 826 and 834. A wait state includes a state where communication with or access to the application program interface 802 or associated control system is unavailable. For example, the application program interface or associated control system blocked. Herein blocked is not a reference to loss of separation between agents, e.g., actual or projected interference or collision of rigid bodies and/or associated buffer zones, or other physical impediment, e.g., dynamic situation in which two agents corrective actions to deal with loss of separation leads to further corrective actions. At 834, the second agent 806 sends a status message 836 to the application program interface 802. Receipt of the status message 836 allows the application program interface 802 or associated control system to process query 832. At 838, the application program interface 802 synchronously sends a response 840, including processor-readable information that specifies an output state, to the first agent 804. The application program interface 802 or associated control system wait until the first agent 804 completes a task in accordance with the response 840. At 842 the first agent 804 completes the task and sends a status message 844 to the application program interface 802.

As illustrated in FIG. 8A, synchronous communication between the application program interface 802 and the first agent 804 or the second agent 806 causes application program interface 802 or associated control system to wait for status messages and be unavailable for communication with other agents.

Referring to FIG. 8B, method 850 includes an example of simulation of aspects of the first agent 804, the second agent 806, control system, or communication between agents and control system, e.g., via API 802. The method 850 may use or involve various components, including those described in FIG. 8A and a data store or storage device 852. The storage device 852 may include at least one nontransitory processor-readable storage device which stores therein or thereupon processor-readable information including cache entries comprising one or more item numbers and one or more associated output states.

At 854, the first agent 804 sends a query 812 to the application program interface 802 communicatively coupled to a control system (not shown). The query 812 includes an item number for an item being processed by the first agent 804, and a request for an output state for the item. At 856 the application program interface 802 sends a response 816 (e.g., sends to first agent 804) including processor-readable information that specifies an output state. The first agent 804 receives the response 816 and, at 858 replies with a sham (e.g., false or fictitious) status message 860 (e.g., success message, fail message) to the application program interface 802. The first agent 804 continues to process the item associated with query 812 in accordance with the response 816. However, in response to receipt of the sham status message 860 the application program interface 802 or the associated control system moves one from a wait state, e.g., is unblocked.

At 862, the second agent 806 sends query 864 to the storage device 852. The query 864 includes an item number of an item being processed by the second agent 806. If the item was previously processed by the first agent 804, then, at 866, the storage device 852 sends a response 868 including process-readable information that specifies an output state. The second agent 806 can then place the item referred to in query 864 into the output state included in response 868.

At a time after 858, e.g. at 870, the first agent 804 updates, or causes an update in, the storage device 852. The update 872 includes, in the form of process-readable information, the item number and the output state included in query 812 and response 816. Update 872 is an example of how storage device 852 may store a plurality of cached entries that it provides in response to queries, such as, query 864.

At 874, the first agent 804 sends query 832 to the application program interface 802. At 876, the application program interface 802 synchronously sends to the first agent 804 a response 840 including processor-readable information that specifies an output state. The application program interface 802 waits until the first agent 804 responds that with a status message. At 878, the first agent 804 replies with a sham status message 880 to the application program interface 802.

At 882, the second agent 806 sends query 884a to the storage device 852. The query 884a includes an item number for an item being processed by the second agent 806 and possibly previously processed by the first agent 804. At 886, the storage device 852 responds with a response 888 that includes no output state, e.g., processor-readable information that specifies a null response. For example, the item number was not previously stored in the storage device 852, not previously processed by the first agent 804, or the like. At 890, the second agent 806 sends query 884b to the application program interface 802 to be processed by the associated control system.

Processing in method 850 continues per similar queries and responses as shown and described above. Method 850 includes less conflict between the first agent 804 and second agent 806 as compared to the method 800. For example, the application program interface 802 or associated control system is/are not in a wait state as the agents send queries.

Figure 9A:
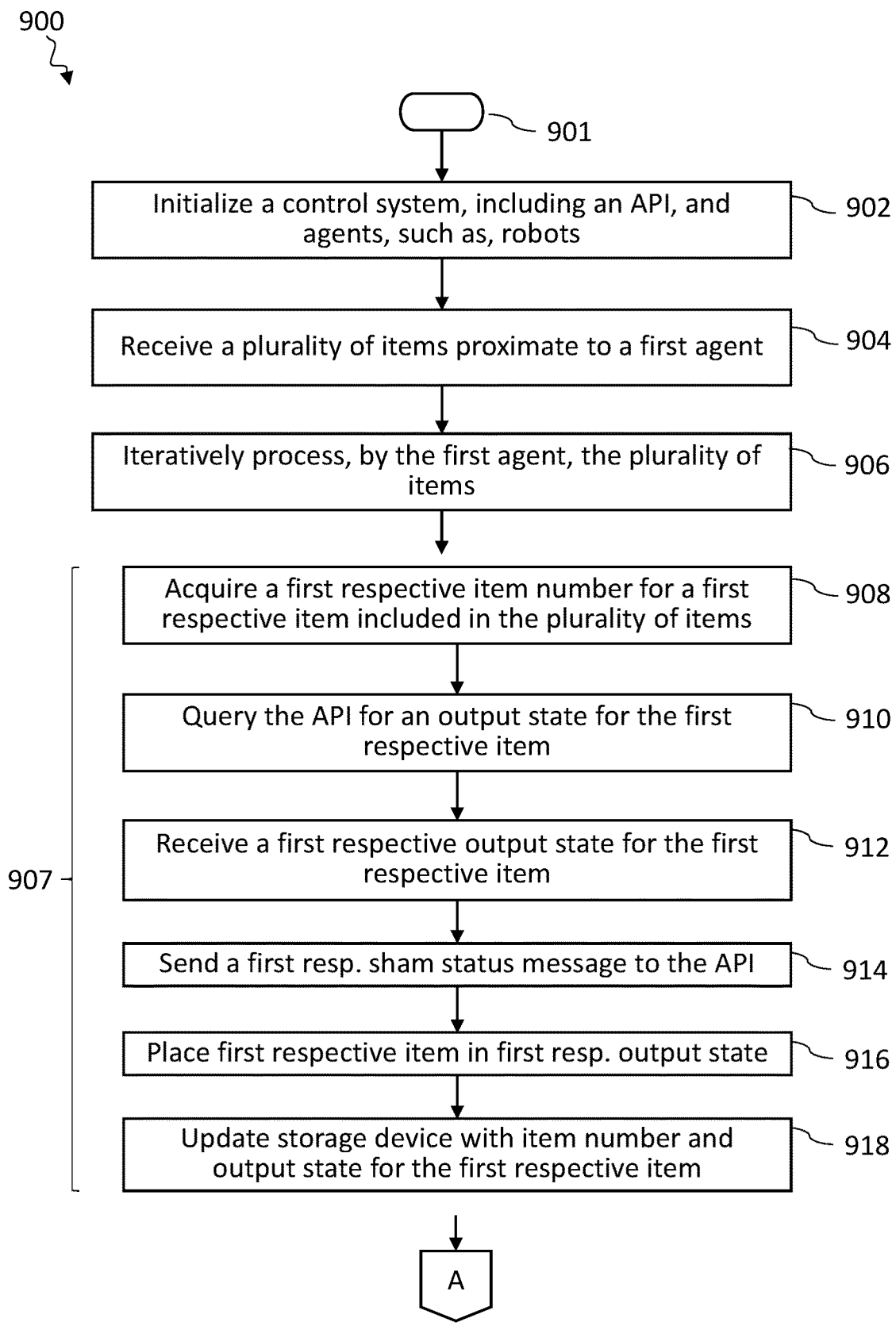
FIG. 9A is a flow-diagram of an implementation of a first part of a method of operation in a system including at least one robot and a control system, which when executed, processes a plurality of items.
Figure 9B:
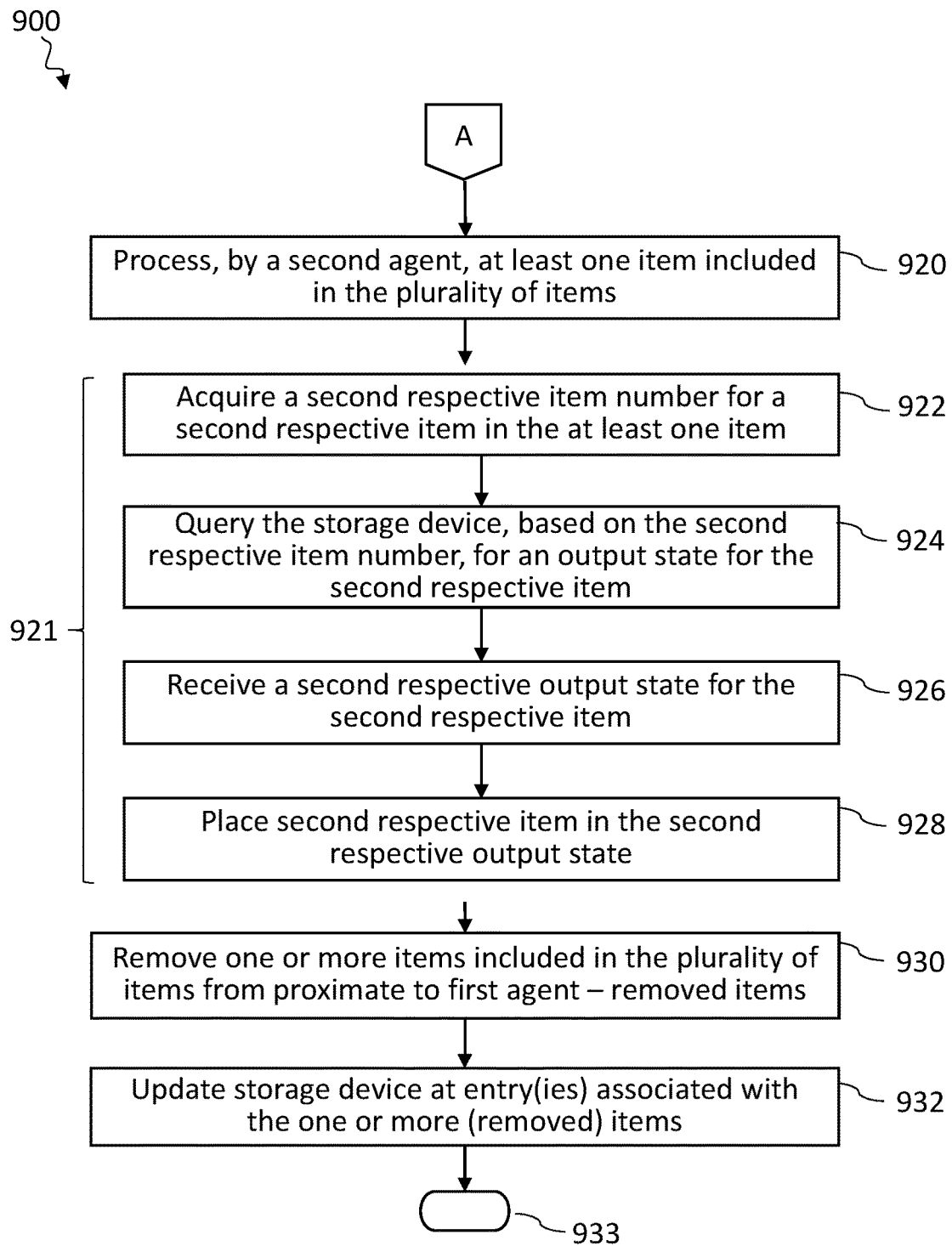
FIG. 9B is a flow-diagram of an implementation of a second part of the method illustrated in FIG. 9A.

FIGS. 9A and 9B show methods 900 executable by a controller, such as circuitry, for instance at least one hardware processor, for operation in a robotic system. FIG. 9A illustrates a first part of method 900 and FIG. 9B illustrates a second part of method 900. Method 900, in part, describes how a controller directs a system including at least one robot and a control system, and the method when executed, processes a plurality of items. Those of skill in the art will appreciate that other acts may be included, removed, and/or varied or performed in a different order to accommodate alternative implementations. Method 900 is described as being performed by a controller, for example, a control subsystem or processor(s) in computer system 106 or system 300, in conjunction with other components, such as those found in, system 100, computer system 106, robot 200, system 300, and device 400. However, method 900 may be performed by multiple controllers or by another system.

For performing part or all of method 900, the controller may be at least one hardware processor. A hardware processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The hardware processor may be referred to herein by the singular, but may be two or more processors. The hardware processor(s) may, for example, execute one or more sets of processor-executable instructions and/or data stored on one or more nontransitory processor-readable storage devices. For performing part or all of method 900 one or more robots may be included in the operation of a robotic system. Exemplary robots and components are described herein.

Method 900 begins at 901, for example, in response to an invocation by the controller.

At 902, the controller initializes a control system and/or an included or associated an API, and agents, such as, robots. In some implementations, the first agent is device 400 and the second agent is human worker 461. The control system and included or associated API may be the processor-executable control system instructions or data 372; and processor-executable application program interface instructions or data 374 described above in relation to, at least, FIG. 3.

At 904, a plurality of items is received proximate to the first agent. Proximate includes where a plurality of items is reachable by at least one end-effector included in the first agent. For example, unmanned ground vehicle (UGV) move the plurality of items to area input space 408 or location reachable by manipulator 406 and end-effector 407. In some implementations, the controller does not direct plurality of items to be received proximate to the first agent. The controller may only be notified the items have been disposed in a location, or may determine that the items have been disposed in a location for example via processing of sensor data (e.g., images, motion sensing) from one or more sensors positioned to surveil the location. The first agent and the second agent can operate, at least temporarily, from a location or station.

At 906, the controller causes the first agent to iteratively process the plurality of items. To iteratively process the plurality of items, the first agent may perform sub-method 907 for each item in the plurality of items. In some implementations, sub-method 907 includes acts 908-918 (even reference numbers). Other implementations and other acts suitable for inclusion in sub-method 907 are described in relation to, at least, FIG. 10.

At 908, the controller acquires a first respective item number for a first respective item included in the plurality of items. For example, the controller receives information from a bar code scanner or radio frequency identification (RFID) interrogator or antenna thereof located proximate to the first agent.

At 910, the controller, queries (e.g., sends processor-readable information in conventional query format) to a control system for the agent via an associated API (e.g., in communication with). The query semantically includes a request for an output state for the first respective item. The query could be sent to a specified socket or port under a TCP/IP transport protocol. The message could be specified in a markup language, e.g., XML or JSON or in native encoding, e.g., binary code. An example query includes: <START> . . . <Item Number><Station Number><END>. The <START> and <END> placeholders can be replaced with mark-up tags or characters. The <Item Number> may be replaced with a first respective item number for the first respective item included in the plurality of items. The first respective item number may be an integer or a string, e.g., twenty character string. The <Station Number> placeholder may be replaced with a processor-readable identifier for a location from which the first agent currently operates. The processor-readable identifier for the location may be an integer or a string, e.g., ten character string.

At 912, the controller, receives a response that includes a first respective output state for the first respective item. For example, the controller, receives the response from a control system via a communicatively coupled API. The response may include processor-readable information. The response may specify a job via a job set of instructions. An example response includes: <START> . . . <Output State><Station Number><END>. Another example response includes: <START> . . . <Output State><Item Number><Station Number><END>. The first example may be used in synchronous calls from an agent to the API. The second example may be used with asynchronous calls from an agent to the API. The <Output State> placeholder may be an output location (e.g., stow location) or an output condition for the first respective item.

At 914, the controller, sends a first respective sham status message to the control system via the API. Example sham status message includes: <START> . . . <Status><Output State><Item Number><Station Number><END> or <START> . . . <Status><Output State><Station Number><END>. Here <Status> is an identifier of an outcome such as, zero for success and one for fail, or vice versa. The status message sent by the controller at 914 is a sham or factitious message because the first item need not be in the output state received by the controller at 912. For example, the controller sends a sham status message before actual completion of the job specified by the job set of instructions included in the response received at 912.

At 916, the controller, places or causes the first respective item to be placed in the output state received by the controller at 912. For example, the output state could include a location, such as, a cubby, as identified by reception spaces 412 in device 400. In some implementations, the output state could include combining the item with one or more ancillary items such as combine with a standard part and/or pack into a container.

At 918, the controller updates, or causes an update of, a data store or storage device in communication with the controller. The storage device may include at least one nontransitory processor-readable storage device and store therein or thereupon processor-readable information including a plurality of cache entries comprising one or more item numbers and one or more associated output states. The controller updates the storage device with the item number and the output state for the first respective item. For example, the controller updates the storage device with the item number and the output state for the first respective item at a respective cache entry in the plurality of cache entries. The controller or similar device may access (e.g., query) the storage device in future acts to retrieve the item number and the output state for the first respective item. For example, the controller could query the storage device for an output state based on an item number.

Sub-method 907 may then end or iteratively repeat until the plurality of items have all been processed. Method 900 continues. See, for example, FIG. 9B. In some implementations, method 900 could continue in accordance with method 1100 shown or described in relation to FIG. 11. In some implementations, method 900 (second part) could continue after performing method 1000 shown or described in FIG. 10. In some implementations, method 900 may be followed by method 1200 shown or described in relation to FIG. 12.

Referring to FIG. 9B method 900 continues at 920. At 920, the controller, executing processor-executable instructions, causes the second agent to process at least one item included in the plurality of items. To process the at least one item the second agent may perform sub-method 921. The at least one item may be termed error item(s), reprocessed item(s), and in the instant case of one item termed a second respective item. In some implementations, sub-method 921 includes acts 922-928 (even reference numbers). Other implementations, including other acts suitable for inclusion in sub-method 921, are described in relation to, at least, FIG. 11.

At 922, the controller acquires a second respective item number for a second respective item included in the at least one item. The second respective item is the respective (e.g., instant) item in act 920 and sub-method 921 while the first respective item is the respective item in act 906 and sub-method 907.

At 924, the controller, queries the storage device. The query semantically includes a request for an output state for the second respective item. Syntactically the query includes processor-readable information that comprises (e.g., semantically) the item number for the second respective item. The storage device (i.e., data or information or instruction storage device) may include at least one nontransitory processor-readable storage device and store therein or thereupon processor-readable information. The processor-readable information may include a plurality of cache entries including one or more item numbers and one or more associated output states.

At 926, the controller, receives a response that includes a second respective output state for the second respective item.

At 928, the controller, places or causes the second respective item to be placed in the output state received by the controller at 926. For example, the end-effector places the second respective item in a pose or position as identified or specified in the second respective output state.

The controller performs sub-method 921 including one or more of acts 922-928 (even reference numbers) until all items in the at least one item have been processed. Method 900 continues at 930.

At 930, one or more items in the plurality of items is removed from proximate to the first agent. For example, the second agent unloads a plurality of extractions spaces. The one or more items in the plurality of items removed from proximate to the first agent defined a set of removed items.

At 932, the controller updates the storage device at the entries associated with the set of removed items. For example, the controller updates a local nontransitory processor-readable storage device which stores therein or thereupon processor-readable information. The controller updates the processor-readable information at a plurality of cache entries associated with the set of removed items.

Method 900 ends at 933 until invoked again.

Figure 10:
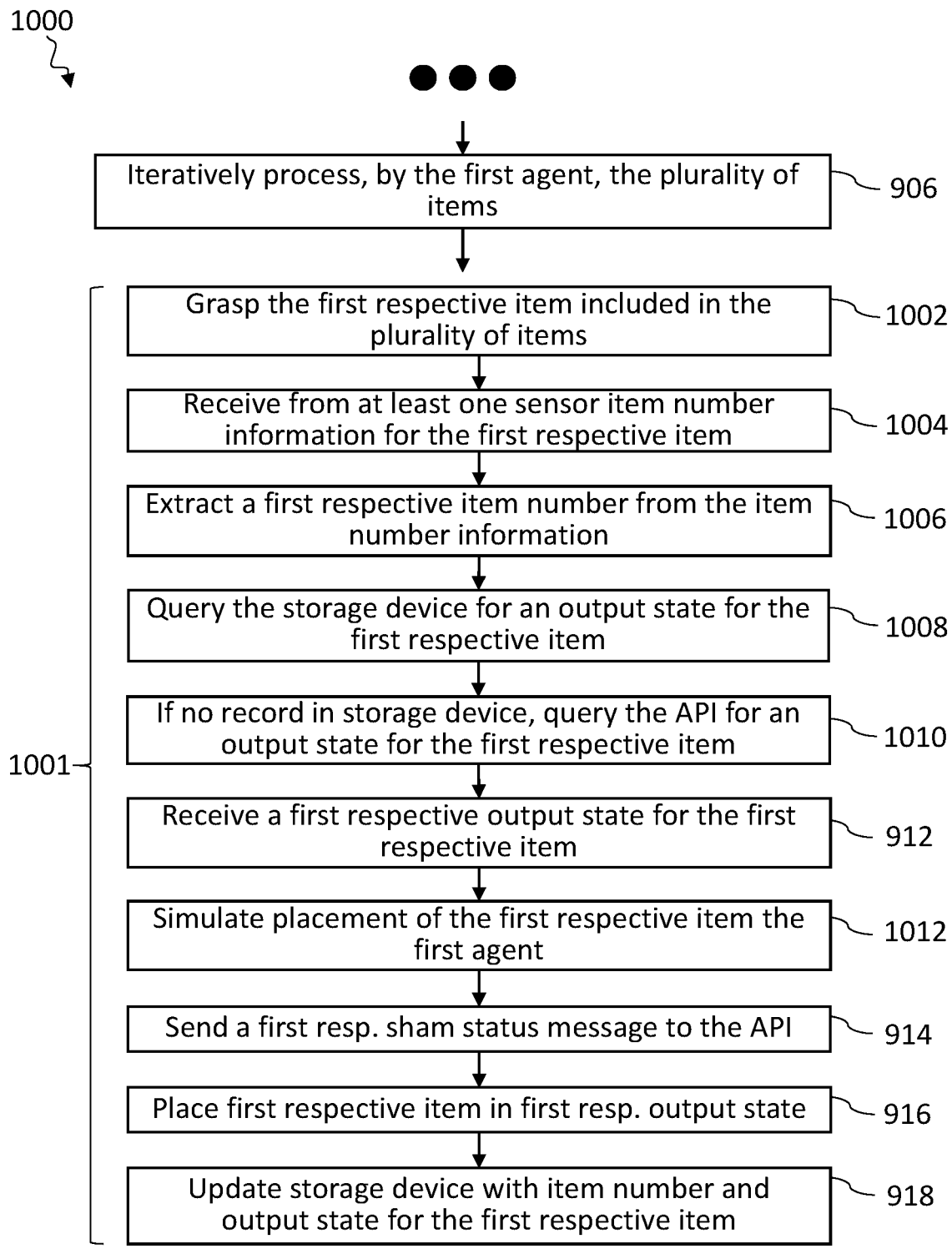
FIG. 10 is a flow-diagram of another implementation of the method illustrated in FIG. 9A.

FIG. 10 shows method 1000 executable by a controller, such as circuitry or at least one hardware processor, for operation in a robotic system. FIG. 10 illustrates acts that may be included in act 906 or sub-method 907 of method 900. See FIG. 9A. Method 1000, in part, describes how a controller may make use of a storage device. Those of skill in the art will appreciate that other acts may be included, removed, and/or varied or performed in a different order to accommodate alternative implementations. Method 1000 is described as being performed by a controller, for example, a control subsystem or processor(s) in computer system 106 or system 300, in conjunction with other components, such as those found in, system 100, computer system 106, robot 200, system 300, and device 400. However, method 1000 may be performed by multiple controllers or by another system.

Method 1000 begins at 906. At 906, the controller causes the first agent to iteratively process the plurality of items. To iteratively process the first agent may perform sub-method 1001 for each item in the plurality of items. In some implementations, sub-method 1001 includes acts 912-918, and 1002-1012 (even reference numbers).

At 1002, the controller causes the first agent to grasp the first respective item included in the plurality of items. Again, the first respective item is the instant item of sub-method 1001 and sub-method 907 and not the first item processed in either sub-method.

At 1004, the controller receives from at least one sensor, e.g., camera 502, RFID interrogator, first respective item number information, such as, one or more images of a machine-readable symbol (e.g., barcode symbol) or other identifier.

At 1006, the controller exacts a first respective item number from the first respective item number information. That is, process the first respective item number information to resolve a first respective item number in processor-readable format. Acts 1002, 1004, and 1006 may collectively or individually be included in act 908 of method 900.

At 1008, the controller, queries the storage device. The query semantically includes a request for an output state for the first respective item. Syntactically the query includes processor-readable information that comprises (e.g., semantically) the first respective item number.

At 1010, if the storage device did not include (e.g., not in, did not store) an output state for the first respective item, the controller queries a control system via an application program interface for the output state for the first respective item. The queries at 1008 and 1010 may semantically and syntactically resemble the queries at 910 and 924.

At 912, the controller receives a response that includes a first respective output state for the first respective item. For example, the controller, receives the response from the storage device or the application program interface. The response at 912 may semantically and syntactically resemble the response at 926.

At 1012, the controller simulates the placement of the first respective item in the first respective output state. For example, the output state includes a stow location, e.g., a reception space 412 in device 400. The controller may determine if the first agent has access to or may use the specified stow location. For example, the stow location could be incorrectly specified and not present at the station where the first agent operates. In some implementations, the controller simulates movement of an end-effector to a reception space. The output state could include a directive to combine the first respective item with another item, e.g., place in container, attach ancillary part. The controller, in simulating the placement of the first respective item may determine the first respective output state is impossible and place the first respective output state in an error cubby.

At 914, the controller sends a first respective sham success message to the control system via the application program interface. At 916, the controller places or causes the first respective item to be placed in the output state received by the controller at 912. At 918, the controller updates, or causes an update of, a storage device in communication with the controller. The controller updates the storage device with the item number and the output state for the first respective item.

Sub-method 1001 ends after the controller performs one or more of acts 912-918, and 1002-1012 (even reference numbers) iteratively until the first agent has iteratively processed the plurality of items. The controller may continue the method per methods 900 or 1100 shown or described in FIG. 9B or FIG. 11.

Figure 11:
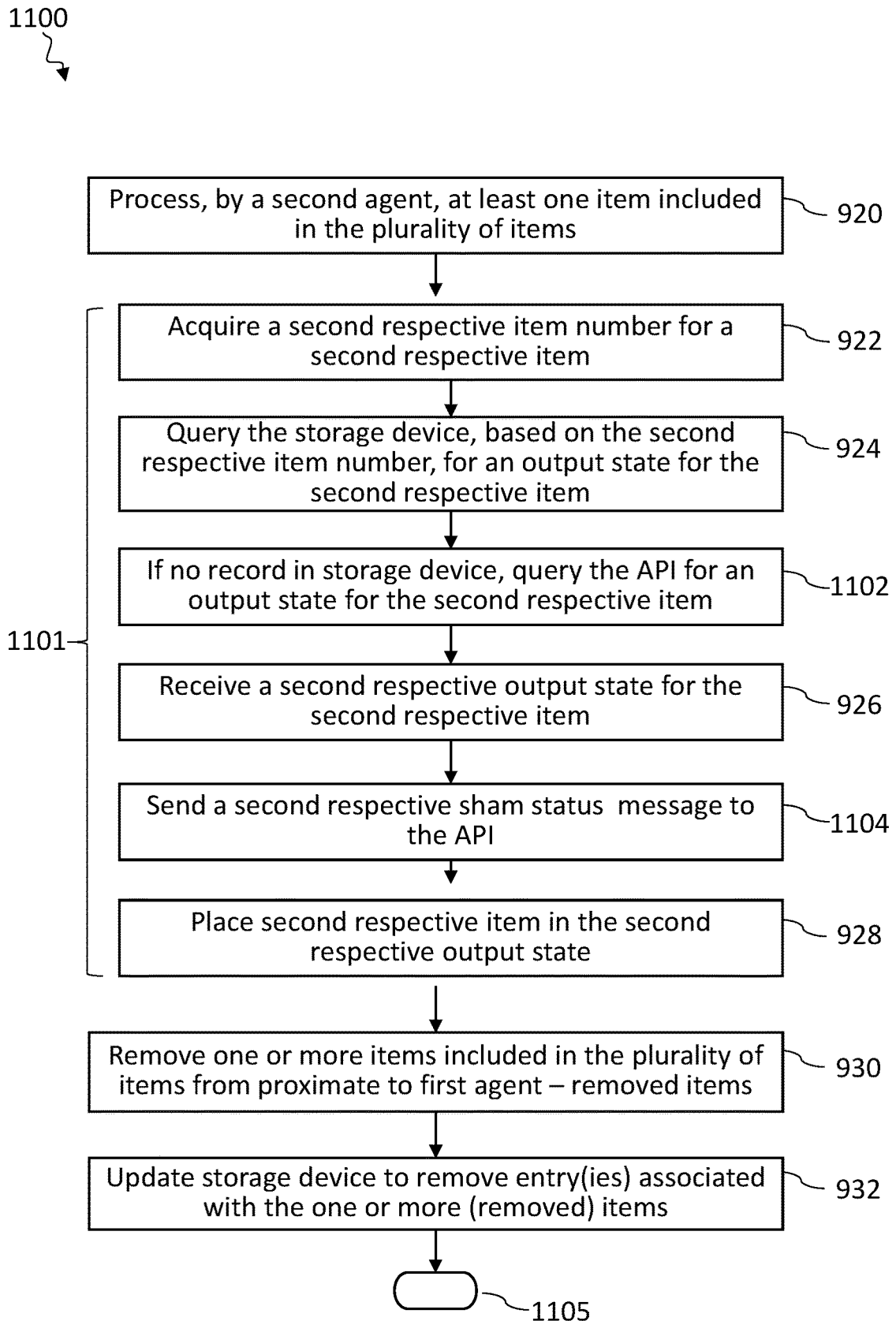
FIG. 11 is a flow-diagram of another implementation of the method illustrated in FIG. 9B.

FIG. 11 shows method 1100 executable by a controller, such as circuitry or at least one hardware processor, for operation in a robotic system. FIG. 11 illustrates acts that may be included in act 920 or sub-method 921 of method 900. Method 1100, in part, describes how a controller may make use of a storage device or an API. Those of skill in the art will appreciate that other acts may be included, removed, and/or varied or performed in a different order to accommodate alternative implementations. Method 1100 is described as being performed by a controller, for example, a control subsystem or processor(s) in computer system 106 or system 300, in conjunction with other components, such as those found in, system 100, computer system 106, robot 200, system 300, and device 400. However, method 1100 may be performed by multiple controllers or by another system.

Method 1100 begins after one or more acts such as those in methods 900 or 1000 shown or described in FIG. 10 or FIG. 11. At 920, the controller, executing processor-executable instructions, causes the second agent to process at least one item included in the plurality of items. To process the at least one item the second agent may perform sub-method 1101. In some implementations, sub-method 1101 includes acts 922-928, 1102, and 1104 (even reference numbers).

At 922, the controller acquires a second respective item number for a second respective item included in the at least one item. The second respective item is the respective (e.g., instant) item in act 920, sub-method 921, and sub-method 1101.

At 924, the controller queries the storage device. The query is based on the second respective item number.

At 1102, if the storage device did not include (e.g., not in, did not store) an output state for the second respective item, the controller, queries the control system via the application program interface for the second respective output state for the second respective item. The queries at 924 and 1102 may semantically and syntactically resemble the queries at 910, 1008, and 1010.

At 926, the controller receives a response that includes a second respective output state for the second respective item. The response at 926 may semantically and syntactically resemble the response at 912.

At 1104, the controller sends a second respective sham success message to the application program interface. The second respective sham success message may semantically and syntactically resemble the first respective sham success message at 914. The second respective sham success message application program interface and/or associated control system to move on from a wait state.

At 928, the controller places or causes the second respective item to be placed in the output state received by the controller at 926.

The controller performs sub-method 1101 including one or more of acts 922-928, 1102, and 1104 (even reference numbers) until all items in the at least one item have been processed. Method 1100 continues at 930.

At 930, one or more items in the plurality of items are removed from proximate to the first agent. At 932, the controller updates the storage device at the entries associated with the set of removed items.

Method 1100 ends at 1105 until invoked again.

Figure 12:
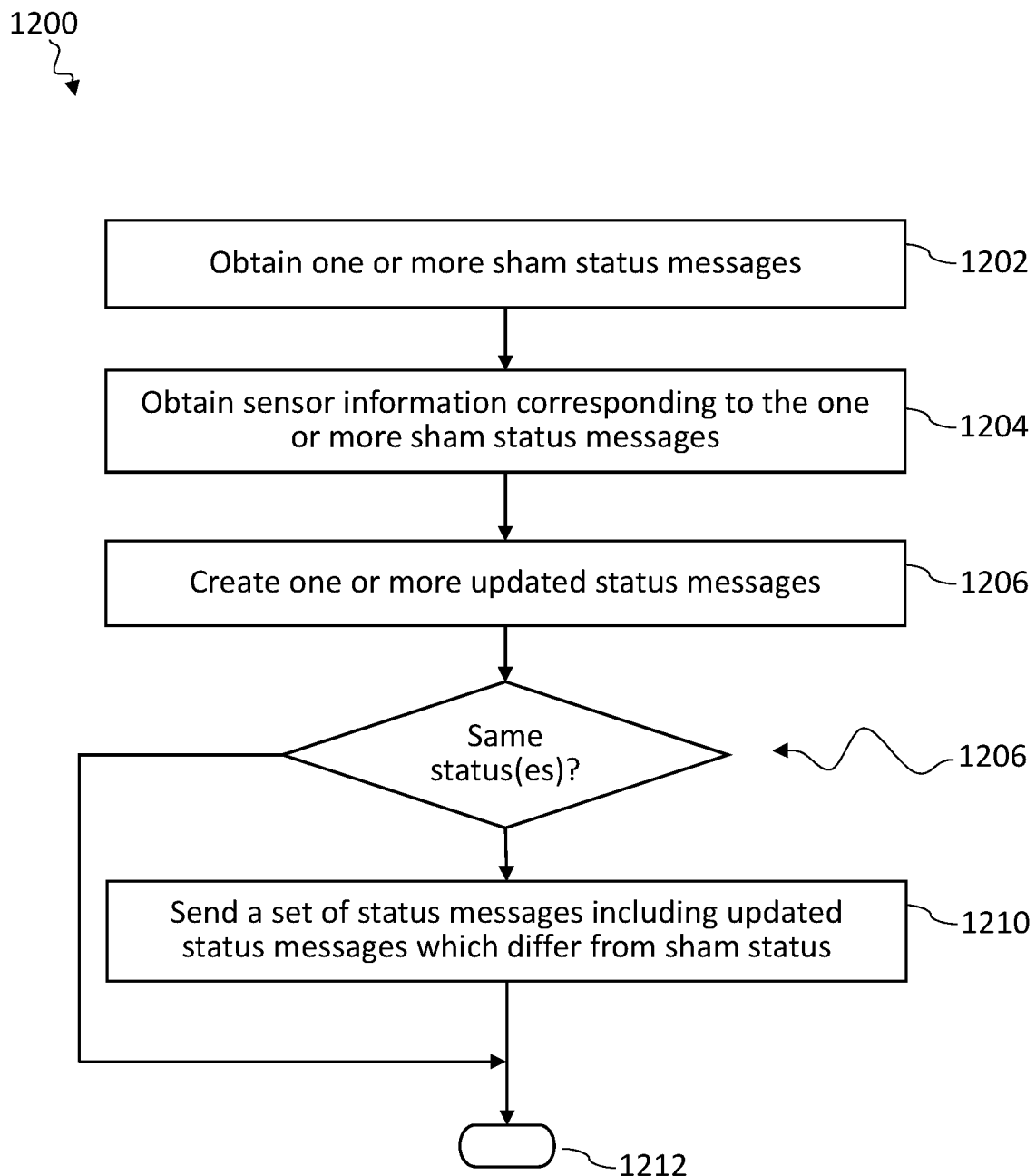
FIG. 12 is a flow-diagram of an implementation of a method that may follow one or more methods shown in FIG. 7, 8B, 9A, 9B, 10, or 11.

FIG. 12 shows method 1200 executable by a controller, such as circuitry or at least one hardware processor, for operation in a robotic system. FIG. 12 illustrates acts which may follow methods and acts described herein. Method 1200, in part, describes how a controller may send a replacement status message to API. Those of skill in the art will appreciate that other acts may be included, removed, and/or varied or performed in a different order to accommodate alternative implementations. Method 1200 is described as being performed by a controller, for example, a control subsystem or processor(s) in computer system 106 or system 300, in conjunction with other components, such as those found in, system 100, computer system 106, robot 200, system 300, and device 400. However, method 1200 may be performed by multiple controllers or by another system.

Method 1200 begins after one or more acts such as those in methods 900, 1000, or 1100 shown or described in FIG. 9A, FIG. 9B, FIG. 10, or FIG. 11. At 1202, the controller, executing processor-executable instructions, obtains one or more sham status messages. Each status message of the one or more sham status messages could include a sham success message, or a sham fail message. Each status message of the one or more sham status messages could have been previously sent to an API or stored in a processor-readable storage device. For examples, method 1200 could follow one or more instances of the controller sending a sham status message to a control system as described in relation to 914 or 1104 above.

At 1204, the controller, executing processor-executable instructions, obtains sensor information corresponding to the one or more sham status messages. For example, the controller receives processor-readable sensor information which represents an agent has or has not successfully completed a task. For example, the sensor information may represent a respective item in a plurality of items has been placed in an output state.

At 1206, the controller, executing processor-executable instructions, creates one or more real, final, or updated status messages. The controller processes the sensor information to create processor-readable information which represents one or more statuses for one or more items. For example, the sensor information may indicate an item was dropped.

At 1208, the controller, executing processor-executable instructions, compares the one or more updated status messages and the one or more sham status messages. Method 1200 may be executed per respective sham status or per a plurality of sham statuses. Each sham status in the plurality of sham statuses would be compared to a corresponding updated status.

If the one or more updated status messages are the same as the one or more sham status messages, e.g., 1208—Yes as shown, the controller may take no further action, or further action (not shown), and terminate at 1212.

If the one or more updated status messages are not the same as the one or more sham status messages, e.g., 1208—No as shown, processing continues at 1210. At 1210, controller sends a set of status messages including the updated status messages which differ from the sham status messages the control system via the application program interface.

Method 1200 ends at 1210 until invoked again.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or combinations thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs (i.e., processor-executable instructions) executed by one or more processor based devices (e.g., as one or more sets of processor-executable instructions running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure.

As used herein processor-executable instructions and/or processor-readable data can be stored on any non-transitory computer-readable storage medium, e.g., memory or disk, for use by or in connection with any processor-related system or method. In the context of this specification, a "computer-readable storage medium" is one or more tangible non-transitory computer-readable storage medium or element that can store processes-executable instruction and/ or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-readable storage medium having data stored therein representing software executable by one or more computers, the software including programming instructions to:
   receive, at a first one of at least two agents, a first job set of instructions provided by a controller;

generate a sham status message selected from the group consisting of:
    a sham success message that indicates successful completion of a first job specified via the first job set of instructions, and
    a sham fail message that indicates failure to complete the first job specified via the first job set of instructions;
send, by the first one of the at least two agents, the sham status message before completion of the first job specified via the first job set of instructions;
update a data store to reflect the first job set of instructions;
receive, by a second one of the at least two agents, a second job set of instructions, before completion of the first job specified via the first job set of instructions;
cause the controller to receive sensor information which represents whether the first job is completed; and
cause the controller to generate an updated status message based, at least in part, on the sensor information.

2. The computer-readable storage medium of claim 1, wherein the software further includes programming instructions to:
    cause a comparison of the updated status message and the sham status message.

3. The computer-readable storage medium of claim 1, wherein the data store is local to the at least two agents.

4. The computer-readable storage medium of claim 1, wherein the data store is local to the controller.

5. The computer-readable storage medium of claim 1, wherein the data store is accessed via an application program interface (API).

6. The computer-readable storage medium of claim 1, wherein the software further includes programming instructions to:
    send a query to the data store for the second job set of instructions; and
    receive, by the second one of the at least two agents, the second job set of instructions from the data store, before completion of the first job specified via the first job set of instructions.

7. The computer-readable storage medium of claim 1, wherein the software further includes programming instructions to:
    receive, by the second one of the at least two agents, the second job set of instructions from the controller.

8. A computer-implemented method, comprising:
    receiving, at a first one of at least two agents, a first job set of instructions provided by a controller;
    generating a sham status message selected from the group consisting of:
        a sham success message that indicates successful completion of a first job specified via the first job set of instructions, and
        a sham fail message that indicates failure to complete the first job specified via the first job set of instructions;
    sending, by the first one of the at least two agents, the sham status message before completion of the first job specified via the first job set of instructions;
    updating a data store to reflect the first job set of instructions;
    receiving, by a second one of the at least two agents, a second job set of instructions, before completion of the first job specified via the first job set of instructions;
    causing the controller to receive sensor information which represents whether the first job is completed; and
    causing the controller to generate an updated status message based, at least in part, on the sensor information.

9. The method of claim 8, further comprising:
    causing a comparison of the updated status message and the sham status message.

10. The method of claim 8, wherein the data store is accessed via an application program interface (API).

11. The method of claim 8, further comprising:
    sending a query to the data store for the second job set of instructions; and
    receiving, by the second one of the at least two agents, the second job set of instructions from the data store, before completion of the first job specified via the first job set of instructions.

12. The method of claim 8, further comprising:
    receiving, by the second one of the at least two agents, the second job set of instructions from the controller.

13. A system, comprising:
    one or more processors; and
    memory storing contents that, when executed by the one or more processors, cause the system to perform actions comprising:
        receiving, at a first one of at least two agents, a first job set of instructions provided by a controller;
        generating a sham status message selected from the group consisting of:
            a sham success message that indicates successful completion of a first job specified via the first job set of instructions, and
            a sham fail message that indicates failure to complete the first job specified via the first job set of instructions;
        sending, by the first one of the at least two agents, the sham status message before completion of the first job specified via the first job set of instructions;
        updating a data store to reflect the first job set of instructions; receiving, by a second one of the at least two agents, a second job set of instructions, before completion of the first job specified via the first job set of instructions;
        causing the controller to receive sensor information which represents whether the first job is completed; and
        causing the controller to generate an updated status message based, at least in part, on the sensor information.

14. The system of claim 13, wherein the actions further comprise:
    causing a comparison of the updated status message and the sham status message.

15. The system of claim 13, wherein the data store is local to the controller or at least one of the at least two agents.

16. The system of claim 13, wherein the actions further comprise:
    sending a query to the data store for the second job set of instructions; and
    receiving, by the second one of the at least two agents, the second job set of instructions from the data store, before completion of the first job specified via the first job set of instructions.

17. The system of claim 13, wherein the actions further comprise:
    receiving, by the second one of the at least two agents, the second job set of instructions from the controller.

* * * * *